United States Patent
Tseng et al.

(10) Patent No.: US 11,856,635 B2
(45) Date of Patent: *Dec. 26, 2023

(54) RADIO ACCESS NETWORK NOTIFICATION AREA CONFIGURATION AND MANAGEMENT

(71) Applicant: FG Innovation Company Limited, Tuen Mun (HK)

(72) Inventors: Yung-Lan Tseng, Taipei (TW); Chie-Ming Chou, Taipei (TW); Hung-Chen Chen, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/367,804

(22) Filed: Jul. 6, 2021

(65) Prior Publication Data
US 2021/0337623 A1 Oct. 28, 2021

Related U.S. Application Data

(63) Continuation of application No. 16/193,743, filed on Nov. 16, 2018, now Pat. No. 11,102,838.
(Continued)

(51) Int. Cl.
*H04W 76/27* (2018.01)
*H04W 36/00* (2009.01)
*H04W 68/02* (2009.01)

(52) U.S. Cl.
CPC ....... *H04W 76/27* (2018.02); *H04W 36/0016* (2013.01); *H04W 68/02* (2013.01); *H04W 36/0055* (2013.01)

(58) Field of Classification Search
CPC ......... H04W 36/0016; H04W 36/0033; H04W 36/0055; H04W 68/02; H04W 76/27
See application file for complete search history.

(56) References Cited

U.S. PATENT DOCUMENTS 11,102,838 B2* 8/2021 Tseng .................... H04W 76/27
2013/0079018 A1 3/2013 Teyeb et al.
(Continued)

FOREIGN PATENT DOCUMENTS

CN 106879009 A 6/2017
JP 2014-516502 A 7/2014
(Continued)

OTHER PUBLICATIONS

Kim et al., "Enhanced Context Management for Periodic RNAU in RRC-INACTIVE State", Nov. 13, 2017, U.S. Appl. No. 62/584,911, Total pp. 30 (Year: 2017).*
(Continued)

*Primary Examiner* — Shah M Rahman
(74) *Attorney, Agent, or Firm* — ScienBiziP, P.C.

(57) ABSTRACT

A method for Radio Access Network (RAN) Notification Area (RNA) management for a user equipment (UE) is provided. The method receives a first Radio Resource Control (RRC) message having a first Radio Access Network (RAN) Notification Area (RNA) configuration. The method then stores the first RNA configuration, when the UE is in one of an RRC Connected state, an RRC Inactive state, or transitioning between the RRC Inactive state and the RRC Connected state. The method applies an RNA update procedure based on the first RNA configuration when the UE is in the RRC Inactive state.

20 Claims, 18 Drawing Sheets

Related U.S. Application Data

(60) Provisional application No. 62/587,018, filed on Nov. 16, 2017.

(56) References Cited

U.S. PATENT DOCUMENTS

| | | | |
|---|---|---|---|
| 2014/0023045 A1 | 1/2014 | Li et al. | |
| 2017/0325162 A1 | 11/2017 | Li et al. | |
| 2018/0092157 A1* | 3/2018 | Chen | H04W 76/27 |
| 2018/0270792 A1* | 9/2018 | Park | H04W 68/025 |
| 2018/0270894 A1* | 9/2018 | Park | H04W 76/14 |
| 2018/0270895 A1* | 9/2018 | Park | H04W 24/04 |
| 2018/0352491 A1* | 12/2018 | Shih | H04W 76/27 |
| 2018/0359722 A1* | 12/2018 | Ishii | H04W 60/04 |
| 2018/0368097 A1* | 12/2018 | Singh | H04W 64/003 |
| 2019/0037635 A1* | 1/2019 | Guo | H04W 76/27 |
| 2019/0045379 A1* | 2/2019 | Ishii | H04W 48/12 |
| 2019/0059128 A1* | 2/2019 | Gage | H04W 76/10 |
| 2019/0124572 A1* | 4/2019 | Park | H04W 36/08 |
| 2019/0281524 A1* | 9/2019 | Rugeland | H04W 36/30 |
| 2020/0059851 A1* | 2/2020 | Kim | H04W 76/27 |
| 2020/0059884 A1* | 2/2020 | Chen | H04W 4/02 |
| 2020/0068646 A1* | 2/2020 | Kwon | H04W 60/04 |
| 2020/0178206 A1* | 6/2020 | Turtinen | H04W 52/0216 |
| 2020/0178209 A1* | 6/2020 | Jin | H04W 36/0055 |
| 2020/0205097 A1* | 6/2020 | Wu | H04W 52/0251 |
| 2020/0351723 A1* | 11/2020 | Kim | H04W 48/20 |
| 2020/0383164 A1* | 12/2020 | Kim | H04W 76/11 |

FOREIGN PATENT DOCUMENTS

| | | | | |
|---|---|---|---|---|
| WO | WO-2018107767 A1 * | 6/2018 | | H04W 48/18 |
| WO | WO-2018121644 A1 * | 7/2018 | | H04W 4/00 |

OTHER PUBLICATIONS

ZTE, ZTE Microelectronics, "Consideration on the RAN based notification in RRC_Inactive", R2-167848, 3GPP TSG-RAN WG2 Meeting #96, Reno, USA, Nov. 14-18, 2016.

CATT, "RNA Update and Configuration", R2-1704241, 3GPP TSG-RAN WG2 Meeting #98, Hangzhou, China, May 15-19, 2017.

CATT, "Discussion on RAN initiated paging", R3-170985, 3GPP TSG RAN WG3 Meeting #95bis, Spokane, Washington, USA, Apr. 3-7, 2017.

LG Electronics Inc., "Discussion on paging assistance information in RRC-inactive state", R3-173199, 3GPP TSG-RAN WG3 Meeting #97, Berlin, Germany, Aug. 21-25, 2017.

InterDigital Inc., "RAN Location Area Update Procedure for NR", R2-1710677, 3GPP TSG-RAN WG2 Meeting #99bis, Prague, Czech Republic, Oct. 9-13, 2017.

Fujitsu, "RAN based notification area configuration", R2-1708871, 3GPP TSG-RAN WG2 NR Meeting #99, Berlin, Germany, Aug. 21-25, 2017.

Ericsson, "RAN area updating due to mobility in RRC_INACTIVE", R2-1700894, 3GPP TSG-RAN WG2 #97, Athens, Greece, Feb. 13-17, 2017.

Ericsson,, "RAN area updating due to mobility in RRC_INACTIVE", R2-1704120, 3GPP TSG-RAN WG2 #98, Hangzhou, P.R. of China, May 15-19, 2017.

Nokia et al., "RAN-based Notification Area", R3-172136, 3GPP TSG-RAN WG3 NR#2 Adhoc, Qingdao, P.R. China, Jun. 27-29, 2017.

ZTE Corporation et al., "Considertion on periodic RAN area update procedure", R2-1710429, 3GPP TSG-RAN WG2 Meeting#99bis, Prague, Czech Republic, Oct. 9-13, 2017.

Huawei et al., "Cell reselection for inactive UEs", R2-1710585, 3GPP TSG-RAN WG2#99bis Meeting, Prague, Czech Republic, Oct. 9-13, 2017.

ZTE et al., "Consideration on the RAN based notification in RRC_INACTIVE", R2-1700277, 3GPP TSG-RAN WG2 NR Ad Hoc, Spokane, USA, Jan. 17-19, 2017.

Vivo, "RAN based notification area update", R2-1704587 3GPP TSG-RAN WG2 Meeting #98, Hangzhou, China, Apr. 15-19, 2017.

3GPP TS 23.401 V15.1.0 (Sep. 2017); 3rd Generation Partnership Project; Technical Specification Group Services and System Aspects; GPRS enhancements for E-UTRAN access (Release 15); 650 Route des Lucioles-Sophia Antipolis Valbonne-France.

* cited by examiner

FIG. 7

```
Tracking Area Configuration
CHOICE { ReuseExistingRNA Bollean {true}

TAToAddlist    {  CHOICE   {   sequence    {Cellidentity},   sequence    {RAN    Area    ID},
sequence {Tracking Area ID} }

TAToRemovelist    {   CHOICE    {    sequence    {Cellidentity},   sequence    {RAN    Area    ID},
sequence {Tracking Area ID} }

```
RRC Resume Response
{ ......
RAN Notification Area{
RNAToAddModList{
CHOICE { sequence {CellIdentity}, sequence {RAN Area ID},
        sequence {Tracking Area ID} }
RNAToRemoveList{
CHOICE { sequence {CellIdentity}, sequence {RAN Area ID},
        sequence {Tracking Area ID}}
} ......
}
```

RNA Matching Procedure:

Choice {RNA option 1, RNA option 2, RNA option 3} based on stored RNA option/RNA configuration
{

RNA option 1: (Event#2-1) UE may compare the R_CellIdentity with the CellIdentity list in the stored RNA configuration.

RNA option 2: (Event#2-2) UE may compare the "R_RANAC&R_TAI" with the RAN Area ID list in the stored RNA configuration.

RNA option 3: (Event#2-3) UE may compare the R_TAI with the Tracking Area ID list in the stored RNA configuration.}

```
RAN Notification Area{
RNAToAddModList{
    CHOICE {
option 1 sequence {CellIdentity},
option 2 sequence {RAN Area ID},
option 3 sequence {Tracking Area ID} }

RNAToRemoveList{
    CHOICE { sequence {CellIdentity}, sequence {RAN Area ID},
      sequence {Tracking Area ID}, {releaseall}}
}
......
}
```

FIG. 14

```
RNAToAddModList{
Sequence{ option 1: sequence {CellIdentity},
          option 2: sequence {RAN Area ID},
          option 3: sequence {Tracking Area ID} }
RNAToRemoveList{
Sequence{
          option 1 sequence {CellIdentity},
          option 2 sequence {RAN Area ID},
          option 3 sequence {Tracking Area ID} }
```

1400

RADIO ACCESS NETWORK NOTIFICATION AREA CONFIGURATION AND MANAGEMENT

CROSS-REFERENCE TO RELATED APPLICATION(S)

This application is a continuation application of U.S. patent application Ser. No. 16/193,743, filed on Nov. 16, 2018, which claims the benefit of and priority to provisional U.S. Patent Application Ser. No. 62/587,018 filed on Nov. 16, 2017, the contents of all of which are hereby fully incorporated herein by reference for all purposes.

FIELD

The present disclosure generally relates to wireless communication, and more particularly, to efficient radio access network (RAN) notification area (RNA) configuration and management for the next generation wireless communication networks.

BACKGROUND

The $3^{rd}$ Generation Partnership Project (3GPP) has introduced a new radio resource control (RRC) state: RRC_INACTIVE state, for the next generation (e.g., $5^{th}$ generation (5G)) wireless communication networks. RRC_INACTIVE state aims to achieve power saving with acceptable access latency, and is suitable especially for small data transmission such as machine type communications (MTC) scenarios. When a UE is in RRC_INACTIVE state, the 5G radio access network (5G-RAN) (e.g., including the next generation radio access network (NG-RAN) and/or other 3GPP/non-3GPP access network connecting to a 5G core network) and the UE stores the "UE context" (which may include Access Stratum (AS) context and Non-Access Stratum (NAS) context) of the UE separately. In addition, when the UE is in RRC_INACTIVE state, the UE does not have an RRC connection with the 5G-RAN, although the 5G-RAN keeps a connection with the next generation core network (e.g., 5G Core Network (5GC)). Other characteristics of RRC_INACTIVE state have been under discussion. For example, in RRC_INACTIVE state, the connection between the core network and the radio access network can be maintained. The radio access network can trigger a RAN-based paging procedure of RRC_INACTIVE UEs (i.e., a UE in RRC_INACTIVE state), and no dedicated radio resources are allocated to the UEs.

A RAN-based notification area (RNA) may allow the next generation core network (e.g., 5GC) and the 5G-RAN (e.g., next generation radio access network) to know the rough location of an RRC_INACTIVE UE. The RNA may include one or more cells, one or more RAN areas, one or more tracking areas. However, whether an RNA could be the combination of cells, RAN areas or tracking areas has not been discussed. The RNA is UE-specific and configurable by the 5G-RAN (e.g., by NG-RAN having one or more next generation node Bs (gNBs) and/or one or more next generation evolved node Bs (ng-eNBs)) using dedicated signaling. Also, the radio access network would trigger a RAN-paging procedure for a RRC_INACTIVE UE within the UE's RNA when the CN or RAN wants to exchange data or control signaling with the RRC_Inactive UE. Therefore, it is important for the next generation radio access network (e.g., 5G-RAN) to be aware of the RRC_INACTIVE UE moving out of the configured RNA. So, 5G-RAN would update the RRC_INACTIVE UE's RNA. It should be noted that the RNA update may be different from a core network level location update or a tracking area update, as an RNA is smaller than, equal to, or greater than a tracking area. As a whole, an RRC_INACTIVE UE may incur minimum signaling, minimum power consumption, and minimum resource costs in the core network (e.g., 5GC) and/or the radio access network (e.g., 5G-RAN).

In a RAN-based paging procedure (also known as a RAN paging procedure), an anchor gNB (e.g., a gNB storing an RRC_INACTIVE UE's UE context and keeping the UE's connection with a 5GC) sends RAN-based paging messages, which contain the UE identity (e.g., RRC resume ID) of the target UE, to all the Cells in the UE's RAN-based notification area through backhaul connections. Then, these Cells deliver the paging messages through broadcasting signals. In contrast, RRC_INACTIVE UEs need to continuously monitor and decode the paging messages broadcasted by the RAN. An RRC_INACTIVE UE may recognize that the RAN is paging itself after successfully decoding (at least) one paging message which contains the UE's RRC resume ID. In some implementations, the UE may receive the paging messages triggered by a CN and by a RAN through substantially the same procedures. However, the UE can still identify or determine whether it is paged by a CN or a RAN by identifying the UE identities, since the CN and the RAN page the same UE by using different UE identities contained in the paging messages. An RRC_INACTIVE UE may trigger the RRC Resume procedure after the UE notices or determines that it is paged by the RAN. Based on the RAN-based paging procedure described above, it can be recognized that the RAN-based paging procedure would fail if an RRC_INACTIVE UE leaves the UE's configured RNA without notifying the anchor gNB.

When a UE is in RRC_INACTIVE state, the UE can move within that RNA without notifying the core network and the 5G-RAN. Moreover, without the proper mobility management, when the UE moves out of the RNA without notifying the 5G-RAN, the anchor gNB, which is a gNB that stores the RRC_INACTIVE UE's UE context and keeps the UE's connection with the 5GC, cannot find the RRC_INACTIVE UE. As a result, the RRC_INACTIVE UE may transition to RRC Idle state and so the UE cannot quickly reestablish or resume an RRC connection to the 5G-RAN. In addition, if the UE moving speed is high or the RNA is small, the UE context transfer and RNA update can become more frequent and cause more overhead. Furthermore, incurring frequent UE context transfer from one gNB to another, which does not need the UE context for DL/UL data transmission, can also cause extra overhead to both UE and the 5G-RAN.

Thus, there is a need in the art for UE initiated RNA update procedures to inform the anchor gNB that the RRC_INACTIVE UE has moved out of its RNA, to keep the UE context information at least in one gNB of an RNA, and/or to allow the RRC_INACTIVE UE to quickly reestablish or resume an RRC connection with a target gNB for packet transmission/reception, even when the target gNB is out of the RNA and does not previously have the UE context or a connection to the CN.

SUMMARY

The present disclosure is directed to RNA configuration and management for the next generation wireless communication networks.

In a first aspect, a method for Radio Access Network (RAN) Notification Area (RNA) management by a user equipment (UE) is disclosed. The method includes receiving a first Radio Resource Control (RRC) message having a first Radio Access Network (RAN) Notification Area (RNA) configuration; storing the first RNA configuration, when the UE is in an RRC Connected state, an RRC Inactive state, or transitioning between the RRC Inactive state and the RRC Connected state; and applying an RNA update procedure based on the first RNA configuration when the UE is in the RRC Inactive state.

In an implementation of the first aspect, the first RNA configuration comprises at least one of: a list of cell identities (IDs); a list of RAN Area Codes (RANACs); and a list of Tracking Area Codes (TACs).

In another implementation of the first aspect, the first RRC message is an RRC Connection Suspend message or an RNA Update response message.

In another implementation of the first aspect, the RNA update procedure is triggered either periodically, or when the UE moves out of an RNA defined by the first RNA configuration.

Another implementation of the first aspect, further includes receiving a second RRC message having a second RNA configuration; updating the first RNA configuration based on the second RNA configuration to form a third RNA configuration; and applying the RNA update procedure based on the third RNA configuration when the UE is in the RRC Inactive state.

In another implementation of the first aspect, the second RNA configuration comprises at least one of: one or more cell identities (IDs) to be added to the first RNA configuration; one or more RANACs to be added to the first RNA configuration; and one or more TACs to be added to the first RNA configuration.

In another implementation of the first aspect, the second RNA configuration comprises at least one of: one or more cell identities (IDs) to be removed from the first RNA configuration; one or more RANACs to be removed from the first RNA configuration; and one or more TACs to be removed from the first RNA configuration.

Another implementation of the first aspect further includes receiving a second RRC message having a second RNA configuration; overwriting the first RNA configuration by the second RNA configuration; and applying the RNA update procedure based on the second RNA configuration when the UE is in the RRC Inactive state.

Another implementation of the first aspect further includes receiving a third RRC message without having an RNA configuration; and applying the RNA update procedure based on the first RNA configuration when the UE is in the RRC Inactive state.

In a second aspect, a method for Radio Access Network (RAN) Notification Area (RNA) management by a base station is disclosed. The method includes configuring a first Radio Access Network (RAN) Notification Area (RNA) configuration for a user equipment (UE); sending the first RNA configuration to the UE through a first Radio Resource Control (RRC) message; storing the first RNA configuration; and applying a RAN paging procedure based on the first RNA configuration when the UE is in an RRC Inactive state.

In an implementation of the second aspect, the first RNA configuration comprises at least one of: a list of cell identities (IDs); a list of RAN Area Codes (RANACs); and a list of Tracking Area Codes (TACs).

In another implementation of the second aspect, the first RRC message is an RRC Connection Suspend message or an RNA Update Response message.

In another implementation of the second aspect, the method further includes transmitting a second RRC message having a second RNA configuration to the UE; updating the first RNA configuration of the UE based on the second RNA configuration to form a third RNA configuration; and applying the RAN paging procedure based on the third RNA configuration when the UE is in the RRC Inactive state.

In another implementation of the second aspect, the second RNA configuration comprises at least one of: one or more cell identities (IDs) to be added to the first RNA configuration; one or more RANACs to be added to the first RNA configuration; and one or more TACs to be added to the first RNA configuration.

In another implementation of the second aspect, the second RNA configuration comprises at least one of: one or more cell identities (IDs) to be removed from the first RNA configuration; one or more RANACs to be removed from the first RNA configuration; and one or more TACs to be removed from the first RNA configuration.

In another implementation of the second aspect, the method further includes transmitting a second RRC message having a second RNA configuration to the UE; overwriting the first RNA configuration by the second RNA configuration; and applying the RAN paging procedure based on the second RNA configuration when the UE is in the RRC Inactive state.

In another implementation of the second aspect, the method further includes transmitting a third RRC message without having an RNA configuration to the UE; and applying the RAN paging procedure based on the first RNA configuration when the UE is in the RRC Inactive state.

In another implementation of the second aspect, at least one of the first, second, or third RNA configurations is stored by the base station in Access Stratum (AS) context of the UE.

In another implementation of the second aspect, the method further includes transmitting the first RNA configuration as part of AS context of the UE to one or more target base stations in one or more Handover Preparation Information signals during a handover procedure of the UE.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 7 is a diagram showing an example of tracking area configuration, according to an exemplary implementation of the present application.

FIG. 10 is a diagram showing the content of an example RRC Resume Response for applying delta signaling for RNA configuration update, according to an exemplary implementation of the present application.

FIG. 11 is a diagram showing an RNA matching procedure, according to an exemplary implementation of the present application.

FIG. 14 is a diagram showing an example of an RNAToAddModList and an RNAToRemoveList, according to an exemplary implementation of the present application.

DETAILED DESCRIPTION

Figure 1:
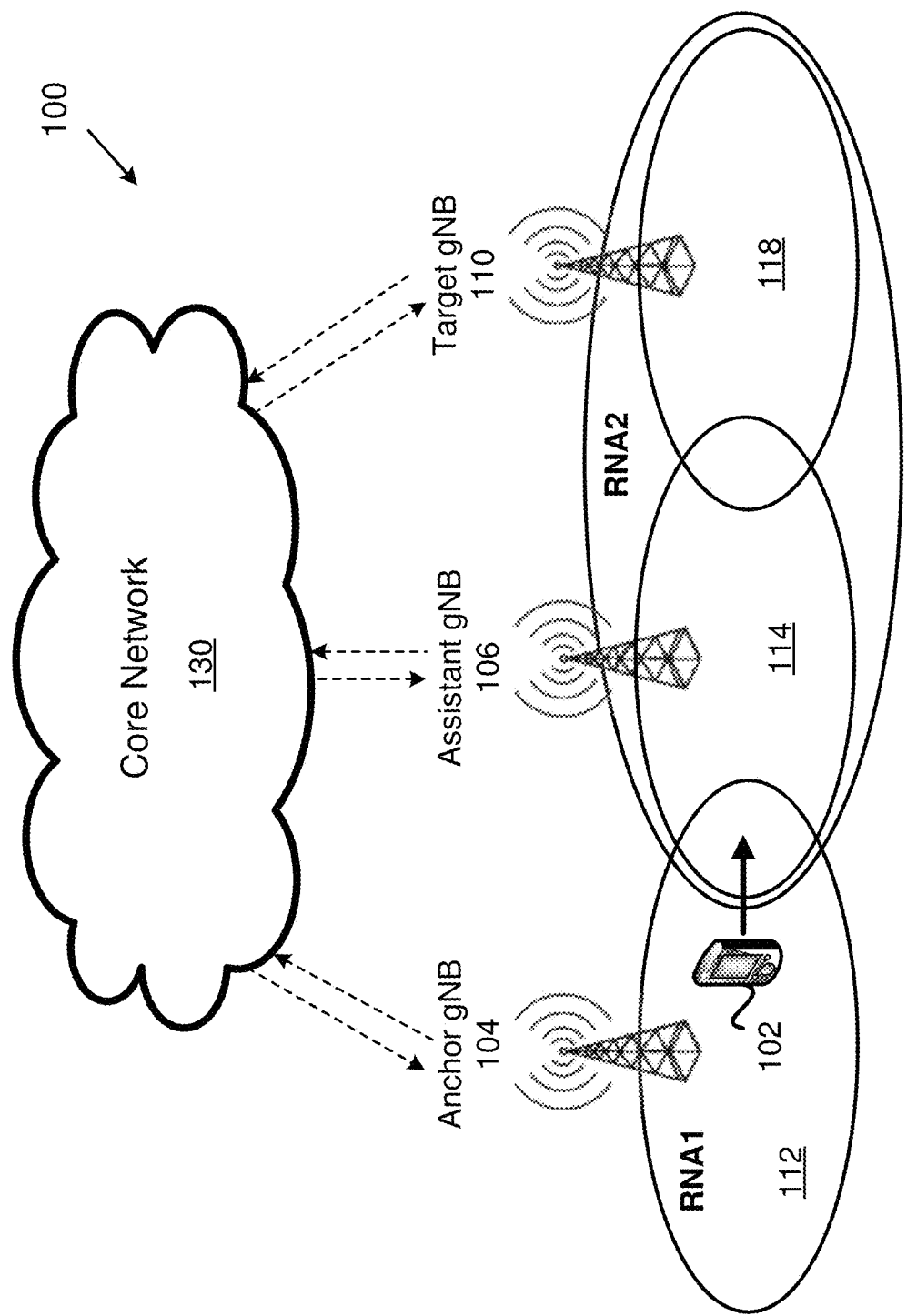
FIG. 1 shows a schematic diagram of an RRC_INACTIVE UE moving from an anchor gNB in a first RNA toward a target gNB in a second RNA through a single assistant gNB in the second RNA, according to an exemplary implementation of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD-ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, a LTE-Advanced Pro system, or a 5G New Radio (NR) Radio Access Network) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a 5G Core (5GC), or an internet), through a radio access network (RAN) established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UNITS, an evolved node B (eNB) as in the LTE-A, a radio network controller (RNC) as in the UMTS, a base station controller (BSC) as in the GSM/GERAN, a ng-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UNITS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services or V2X services.

In various implementations of the present application, UE context within a serving gNB contains information regarding roaming and access restrictions, which were provided either at connection establishment or at the last tracking area update. The UE context may include, but is not limited to, UE Aggregate Maximum Bit Rate, the received Handover Restriction List, the received UE Security Capabilities, the received Security Key, etc. In addition, I-RNTI (inactive-radio network temporary identifier) is a unique identification used to identify the UE context for RRC_INACTIVE UE within a pre-defined area (e.g., Public Land Mobile Networks (PLMN) or the configured RNA to the UE). In various implementations of the present application, the I-RNTI may be included in an RRC resume ID. In various implementation of the present application, the I-RNTI may include the required information to identify the UE context for RRC_I-NACTIVE UE. The required information (e.g., cellidentity of the anchor gNB and the UE identity for the Serving gNB to recognize the anchor gNB of the UE) may also be included in the RRC resume ID. In some other implementations, two I-RNTI values, which one is fullI-RNTI and another is shortI-RNTI (truncation of the fullI-RNTI), may be configured to the UE. During the RRC Resume procedure, the UE would decide which I-RNTI (fullI-RNTI or shortI-RNTI) that the UE could apply based on the available size (e.g., 64 bits or 48 bits) of the RRC Resume Request message.

In various implementations of the present application, an anchor gNB may be the last serving gNB of a UE, before the UE transitioned to RRC_INACTIVE state. The anchor gNB may keep the UE context and the UE-associated connection with the core network (e.g., serving AMF (Access and Mobility management Function) and/or UPF (User Plane Function)). The UE in RRC_INACTIVE state may remain in Connection Management (CM)-CONNECTED, and may move within an RNA without notifying the RAN (e.g., 5G-RAN). However, when the RRC_INACTIVE UE moves out of the RNA in which the anchor gNB is situated, the RRC_INACTIVE UE may initiate an RNA update procedure, among other things, to notify the anchor gNB. In some other implementation, when the RRC_INACTIVE UE moves within the RNA where the anchor gNB is suited, in some situations (e.g., a timer expires), the RRC_INACTIVE UE may initiate an RNA update procedure, among other things, to notify the anchor gNB or another gNB within the RNA on which the RRC_INACTIVE UE now camps. In some additional implementation, when the RRC_INACTIVE UE moves out of the RNA where the anchor gNB is suited, the RRC_INACTIVE UE may initiate an RNA update procedure, among other things, to notify the gNB on which the RRC_INACTIVE UE now camps.

In various implementations of the present application, an assistant gNB may be a gNB other than the anchor gNB. The RRC_INACTIVE UE may camp on the assistant gNB. The assistant gNB may be in the same RNA or in a different RNA than the RNA in which the anchor gNB is situated. The assistant gNB may notify the anchor gNB of the UE's presence in the coverage of the assistant gNB. Then, the assistant gNB may obtain the UE context of the UE from the anchor gNB. After obtaining the UE context from the anchor gNB, the assistant gNB may have the UE's RNA configuration, which includes a list of cell Identities, or a list of RAN Area Identities (RAN Area IDs), or a list of Tracking Area Identifiers (TAIs), or any combination thereof. The assistant gNB may also update the RNA configuration, among other things, to the UE. In other implementations, the assistant gNB may replace the original anchor gNB to become the new anchor gNB of the RRC_INACTIVE UE.

In some implementations, one or more than one cell identity in the RNA configuration may be further associated with one specific PLMN identity. In some implementations, each RAN Area ID in the RNA configuration includes one RAN area code (RANAC) associated with one tracking area code (TAC). Moreover, one or more than one of the RAN Area IDs may be further associated with one PLMN identity. In some implementations, each Tracking Area ID in the RNA configuration would include one tracking area code (TAC). In addition, the Tracking Area code may be associated with one PLMN identity in the TAI. Therefore, one RAN Area ID may be further associated with one PLMN identity (by associating with one TAI). For the cell identity \RAN Area ID\Tracking Area ID that is not associated with one PLMN identity explicitly in the RNA configuration, the cell identity\RAN Area ID\Tracking Area ID is associated with the registered PLMN of the UE implicitly.

A target gNB may be a gNB other than the anchor gNB. The RRC_INACTIVE UE may camp on the target gNB. The target gNB may be in the RNA in which the anchor gNB is situated or out of the RNA. The RRC_INACTIVE UE may attempt to access the target gNB. Upon successfully retrieving the UE Context of the RRC_INACTIVE UE from the anchor gNB (e.g., through one or more assistant gNB or without any assistant gNB), the target gNB may become the serving gNB of the UE for downlink (DL) and/or uplink (UL) transmission. It should be noted that, in various implementations of the present application, either the anchor gNB or the target gNB can also be the assistant gNB.

FIG. 1 shows a schematic diagram of an RRC_INACTIVE UE moving from an anchor gNB in a first RNA toward a target gNB in a second RNA through a single assistant gNB in the second RNA, according to an exemplary implementation of the present application. As shown in FIG. 1, wireless communication system 100 includes user equipment (UE) 102, anchor gNB 104 having gNB coverage area 112, assistant gNB 106 having gNB coverage area 114, and target gNB 110 of UE 102 having gNB coverage area 118, where anchor gNB 104, assistant gNB 106, and target gNB 110 can access core network (CN) 130, such as a next generation core network (e.g., 5GC). It is noted that anchor gNB 104 is within a first RAN-based notification area, RNA1, while assistant gNB 106 and target gNB 110 are within a second RAN-based notification area, RNA2, which is different from RNA1. In the present exemplary implementation, RNA1 and RNA2 are neighboring RAN-based notification areas. In other exemplary implementations, RNA1 and RNA2 may not be immediately adjacent neighboring RAN-based notification areas. In implementation, RNA1 is configured by anchor gNB 104 and RNA2 is configured by assistant gNB 106 to replace RNA1 after UE 102 moving out of RNA1.

Figure 2:
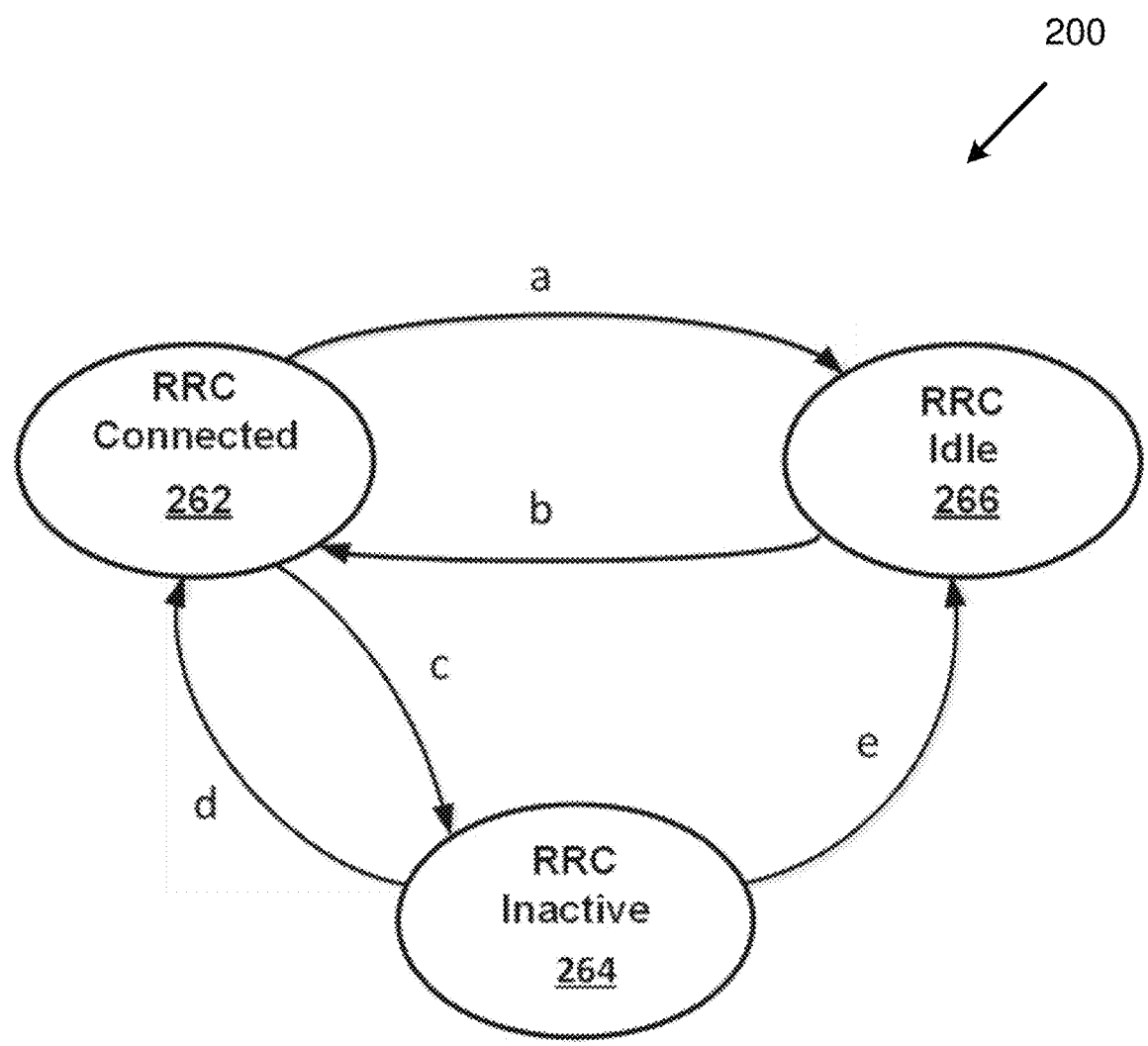
FIG. 2 is an RRC state transition diagram illustrating various RRC state transition procedures that a UE may undergo within a next generation radio access network, according to an exemplary implementation of the present application.

FIG. 2 is an RRC state transition diagram illustrating various RRC state transition procedures that a UE may undergo within a next generation radio access network, according to an exemplary implementation of the present application. The RRC state transition diagram 200 includes RRC_CONNECTED state 262, RRC_INACTIVE state 264, and RRC_IDLE state 266. As shown, a UE may transition among RRC_CONNECTED state 262, RRC_INACTIVE state 264, and RRC_IDLE state 266 through various procedures, a, b, c, d and e. It should be noted that in the RRC state transition diagram 200, a UE may not transition directly from RRC_IDLE state 266 to RRC_INACTIVE state 264. That is, RRC_INACTIVE state 264 always comes after RRC_CONNECTED state 262. For example, the UE may transition from RRC_CONNECTED state 262 to RRC_INACTIVE state 264 through an RRC Suspend procedure (e.g., procedure c). Conversely, the UE may transition from RRC_INACTIVE state 264 to RRC_CONNECTED state 262 through an RRC Resume procedure (e.g., procedure d).

According to various implementations of the present application, the RRC Resume procedure may be realized through a 2-step or 4-step random access procedure.

Figure 3A:
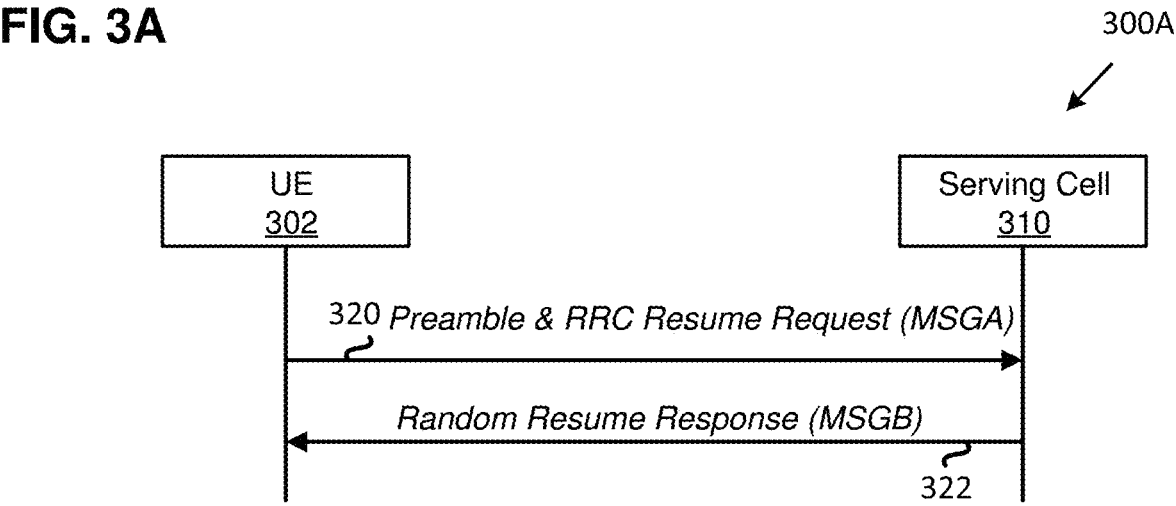
FIG. 3A is a diagram illustrating an RRC Resume procedure achieved by a 2-step random access procedure for storing RNA option and RNA configuration as a part of UE context on both the UE side and Serving Cell side, according to an exemplary implementation of the present application.

FIG. 3A shows an RRC Resume procedure for radio resource control (RRC) performed between an RRC_INACTIVE UE (e.g., UE 302) and a Serving Cell (Serving Cell 310) for the RRC_INACTIVE UE to update RRC state, among other things (e.g., RNA configuration and/or RRC resume ID) based on the RRC Resume procedure, according to an exemplary implementation of the present application. In the present implementation, the RRC Resume procedure may be achieved by a 2-step random access procedure.

As shown in FIG. 3A, diagram 300A includes UE 302 and Serving Cell 310. In action 320, UE 302 may send a Preamble (e.g., a random access preamble) along with an RRC Resume Request message to Serving Cell 310 (through message A (MSGA)). In action 322, Serving Cell 310 may send a Random Access Response (in through message B (MSGB)) to UE 302, if Serving Cell 310 decodes MSGA successfully. Based on the RRC Resume Response from Serving Cell 310, UE 302 may transition from RRC_INACTIVE state to RRC_CONNECTED state, transition from RRC_INACTIVE state to RRC_IDLE state, or remain in RRC_INACTIVE state.

Figure 3B:
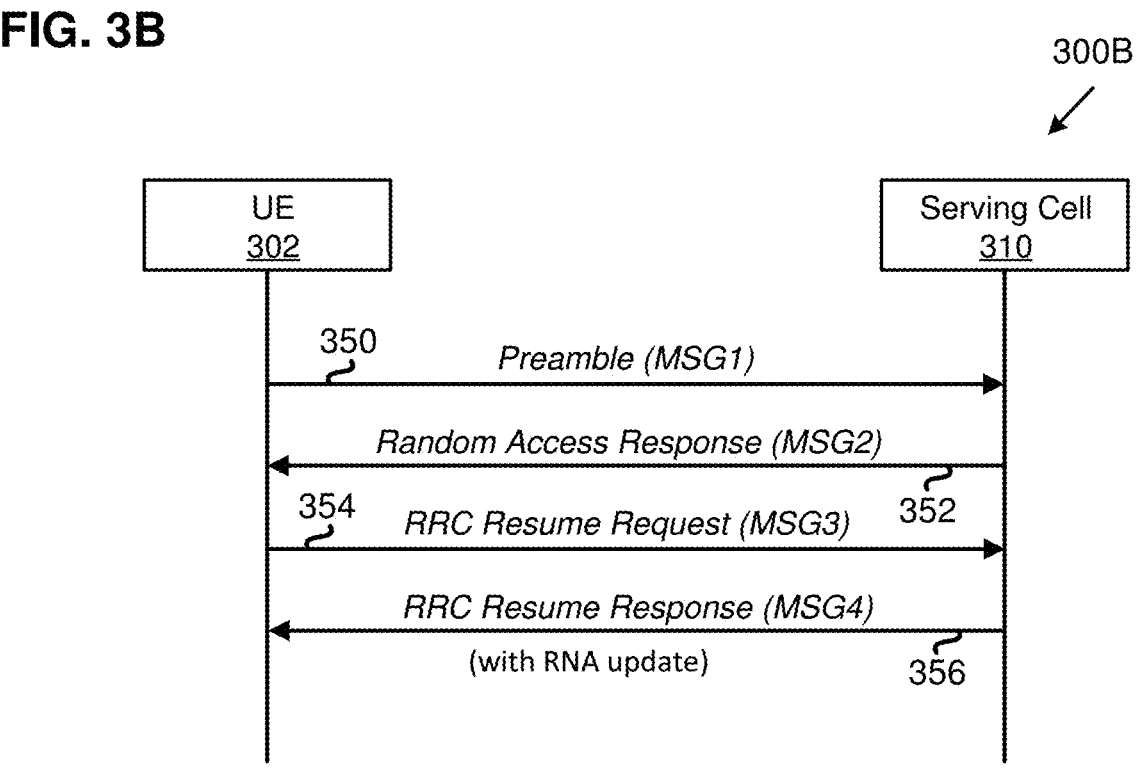
FIG. 3B is a diagram illustrating an RRC Resume procedure achieved by a 4-step random access procedure for storing RNA option and RNA configuration as a part of UE context on both the UE side and Serving Cell side, according to an exemplary implementation of the present application.

FIG. 3B shows an RRC Resume procedure for radio resource control (RRC) performed between an RRC_INACTIVE UE (e.g., UE 302) and a Serving Cell (Serving Cell 310) for the RRC_INACTIVE UE to update RRC state among other things (e.g., RNA configuration or RRC resume ID) based on the RRC Resume procedure, according to an exemplary implementation of the present application. In the present implementation, the RRC Resume procedure may be achieved by a 4-step random access procedure.

As shown in FIG. 3B, diagram 300B includes UE 302 and Serving Cell 310. In action 350, UE 302 may send a Preamble (e.g., a random access preamble) to Serving Cell 310 (through MSG1). In action 352, Serving Cell 310 may send a Random Access Response (in MSG2) to UE 302, if Serving Cell 310 decodes MSG1 successfully. In MSG2, Serving Cell 310 may also send uplink radio resource information for UE 302 to deliver MSG3 (e.g., RRC Connection Resume Request kind of message, RRC Connection Resume Request message, RRC Resume Request message). In action 354, UE 302 may deliver an RRC Resume Request in MSG3 through the given uplink radio resource to Serving Cell 310. In action 356, Serving Cell 310 may send an RRC Resume Response to UE 302. Based on the RRC Resume Response from Serving Cell 310, UE 302 may transition from RRC_INACTIVE state to RRC_CONNECTED state, transition from RRC_INACTIVE state to RRC_IDLE state, or remain in RRC_INACTIVE state.

In a RAN, cells broadcast the CellIdentities (along with associated PLMN identities) and/or RAN Area ID(s) and/or Tracking Area ID(s). Thus, upon receiving the broadcast signals from the RAN, a UE can identify whether the serving Cell is still located in the UE's RNA.

UE 302 in RRC_INACTIVE state may have already been configured with an "existing RNA configuration" before action 350 in the random access procedure shown in FIG. 3B or before action 320 in the random access procedure shown in FIG. 3A. The existing RNA configuration may be configured with different RNA options to help enable RNA configuration update and management.

In one implementation, the existing RNA configuration may include a list of cells, where each Cell is represented by a Cell Identity.

In another implementation, the existing RNA configuration may include a list of RAN Area IDs. For example, each RAN Area ID may be represented by a Tracking Area ID associated with a RANAC (RAN Area Code). A Tracking Area ID is a core network's Registration Area in a PLMN. Each PLMN's Registration Area may be identified by a different Tracking Area Code with the corresponding PLMN identity. RNA signaling may include multiple lists of Tracking Area IDs of one or more than one PLMN(s). For each Registered Area, there may be also one or multiple RANACs associated with the Registered Area.

In yet another implementation, the existing RNA configuration may include a list of Tracking Area IDs. The list of Tracking Area IDs may be a subset of the RNA signaling having a list of TAIs, but without a RANAC for the list of Tracking Area IDs.

As shown in FIG. 3B, the RRC Resume Response may include an RNA update, such as an RNA configuration update. Regardless of UE 302's RRC state after receiving the RRC Resume Response in action 356, the existing RNA may be still useful to UE 302.

When UE 302 transitions from RRC_INACTIVE state to RRC_CONNECTED state, the RAN may instruct UE 302 to store the existing RNA configuration. Therefore, for UE 302, the existing RNA configuration may be part of the UE context. The RAN may re-configure a new or updated RNA configuration based on the stored RNA configuration next time when the RAN instructs UE 302 to move to RRC_INACTIVE state. In some other implementations, the RAN and UE may store the existing RNA configuration automatically without further instruction from the RAN to the UE during the RRC state transitions of the UE.

When UE 302 remains RRC_INACTIVE state after receiving the RRC Resume Response message in action 356 of FIG. 3B or action 322 of FIG. 3A, the RAN may configure a new RNA configuration based on the existing RNA configuration, or reuse the existing RNA configuration to generate a new RNA configuration. In some implementations, the RAN and UE may keep the existing RNA configuration automatically without further instruction from the RAN to the UE if there is no updated RNA configuration in the RRC Resume Response message in action 356 of FIG. 3B or action 322 of FIG. 3A.

RNA Update based on the existing RNA configuration may be beneficial in terms of reducing signaling overhead. For example, UE 302 may do non-periodical/periodical RNA update while staying in RRC_INACTIVE state. For an RRC_INACTIVE UE under low mobility, it is more likely that the existing RNA configuration is still re-usable, or only needs some minor modification.

In addition, in tracking area management, part of the existing tracking area may also become a part of an updated tracking area after the tracking area update. This may prevent the ping-pong effect of tracking area updates.

Figure 3C:
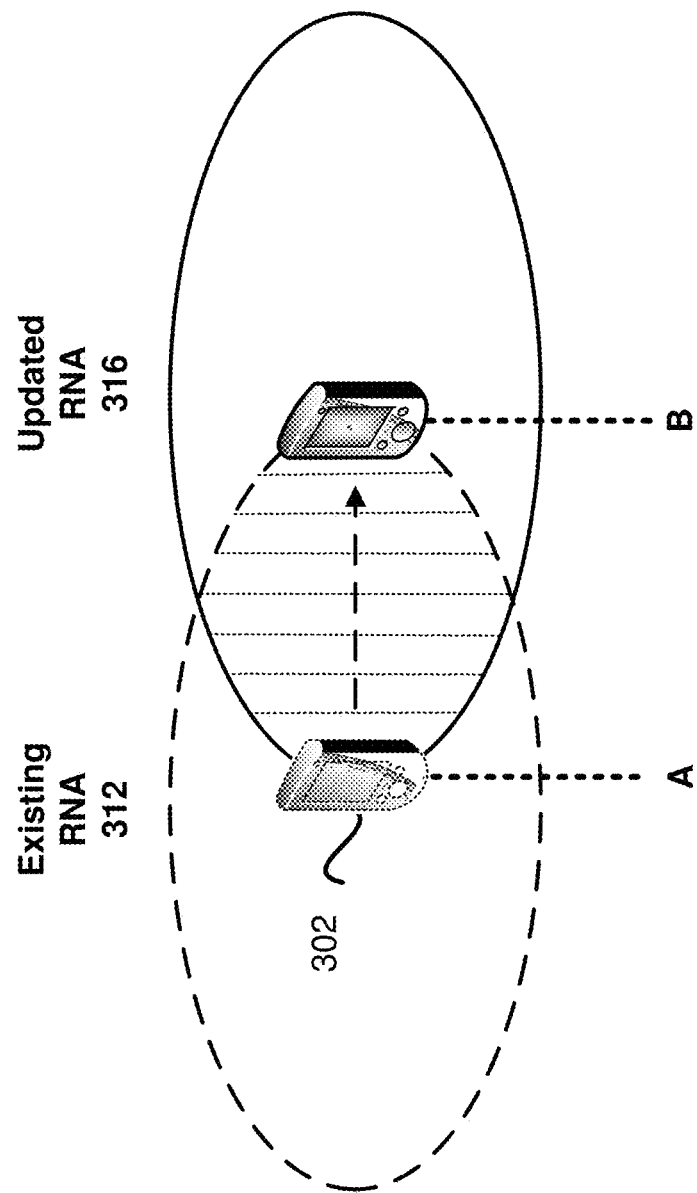
FIG. 3C is a diagram illustrating an overlapping between existing RNA and updated RNA in relation to UE location, according to an exemplary implementation of the present application.

FIG. 3C shows an example of an overlap between an existing RNA and an updated RNA as the location of a UE changes with respect to the existing RNA. As shown in FIG. 3C, UE 302 may move from location A to location B, while in RRC_INACTIVE state. The existing RNA (e.g., RNA 312) may include a list of RAN area IDs. For example, as UE 302 transitions to RRC_INACTIVE state at location A, a serving base station provides the existing RNA 312 to UE 302. In one implementation, all the RAN area IDs in a RAN area IDs list to which UE 302 is registered may be served by the same serving base station or different base stations in the RAN. When UE 302 registers with the network, the base station allocates a set or list of RAN area IDs to UE 302. As UE 302 moves from location A to location B, another serving base station (e.g., having an RNA management) may include functions to (re)allocate a new set of RAN area IDs (a new list of RAN area IDs), based on UE 302's current location (e.g., location B). As shown in FIG. 3C, at location B, UE 302 may perform the RRC Resume procedure with another serving base station as described with reference to FIG. 3A and FIG. 3B above, and receive an updated RNA configuration corresponding to a new RNA (e.g., RNA 316).

In one implementation, as shown in FIG. 3C, by making the center of the updated RNA 316 close to UE 302's current location (e.g., location B), the chance of UE 302 rapidly making another RNA update can be reduced. Also, in some other implementations, the existing RNA (e.g., a list of RAN Area IDs) may be configured by an AMF in a 5GC or by a Mobility Management Entity (MME) in an EPC. In addition, the existing RNA configuration and updated RNA configuration may also be either Cell identities list (with associated PLMN identities) or Tracking Area ID list. In addition, the RNA options (i.e., Cellidentity, RAN Area ID, or Tracking Area ID) of existing RNA configuration and updated RNA configuration needs not to be the same.

When UE 302 transitions from RRC_INACTIVE state to RRC_IDLE state after receiving the RRC Resume Response message in action 356 or action 322, the RAN may help the CN (e.g., AMF in 5GC or MME in EPC) forward the tracking area configuration (e.g., like RRCConnectionRelease message) to UE 302. In one implementation, the tracking area may be exactly the same as the existing RNA. In another implementation, the tracking area may be generated based on the existing RNA configuration, where interactions between the CN and the RAN may be involved. In various implementations of the present application, the RNA configuration may be part of the UE context. As such, the interactions between the CN and the RAN may be achieved through UE context exchange. In various implementations of the present application, delta signaling may be utilized by the network (e.g., CN or RAN) to configure the new/updated tracking area based on the existing RNA.

Based upon the above scenarios, the following two cases including several implementations are presented below.

Case 1: UE and RAN Both Store RNA Configurations

In implementations of the present application, the RNA configuration would not be influenced or affected by RRC state transitions between RRC_CONNECTED state and RRC_INACTIVE state. The UE and/or RAN may store the UE's RNA configuration (and also RNA option when it is provided) in the UE context.

Thus among other advantages, the RAN may provide updated {RNA option, RNA configuration} based on the stored RNA configuration. In addition, delta signaling may help reduce the signaling overhead of the RNA configuration. As the RNA configuration is not influenced or affected by RRC state transition, no matter how many transitions between RRC_INACTIVE state and RRC_CONNECTED state have been done to the UE, the UE may always have an existing RNA configuration. As such, the RAN may provide update to the RNA configuration based on the existing RNA configuration. In addition, the RNA configuration is not influenced or affected by handover procedures. In addition, the CN tracking area optimization may be enabled (e.g., when the RNA configuration is provided, for example, based on a list of Tracking Area IDs.). The RAN/CN may exchange RNA configurations through UE context exchange so that the CN may configure tracking area by delta signaling to the Tracking Area ID list.

Figure 4:
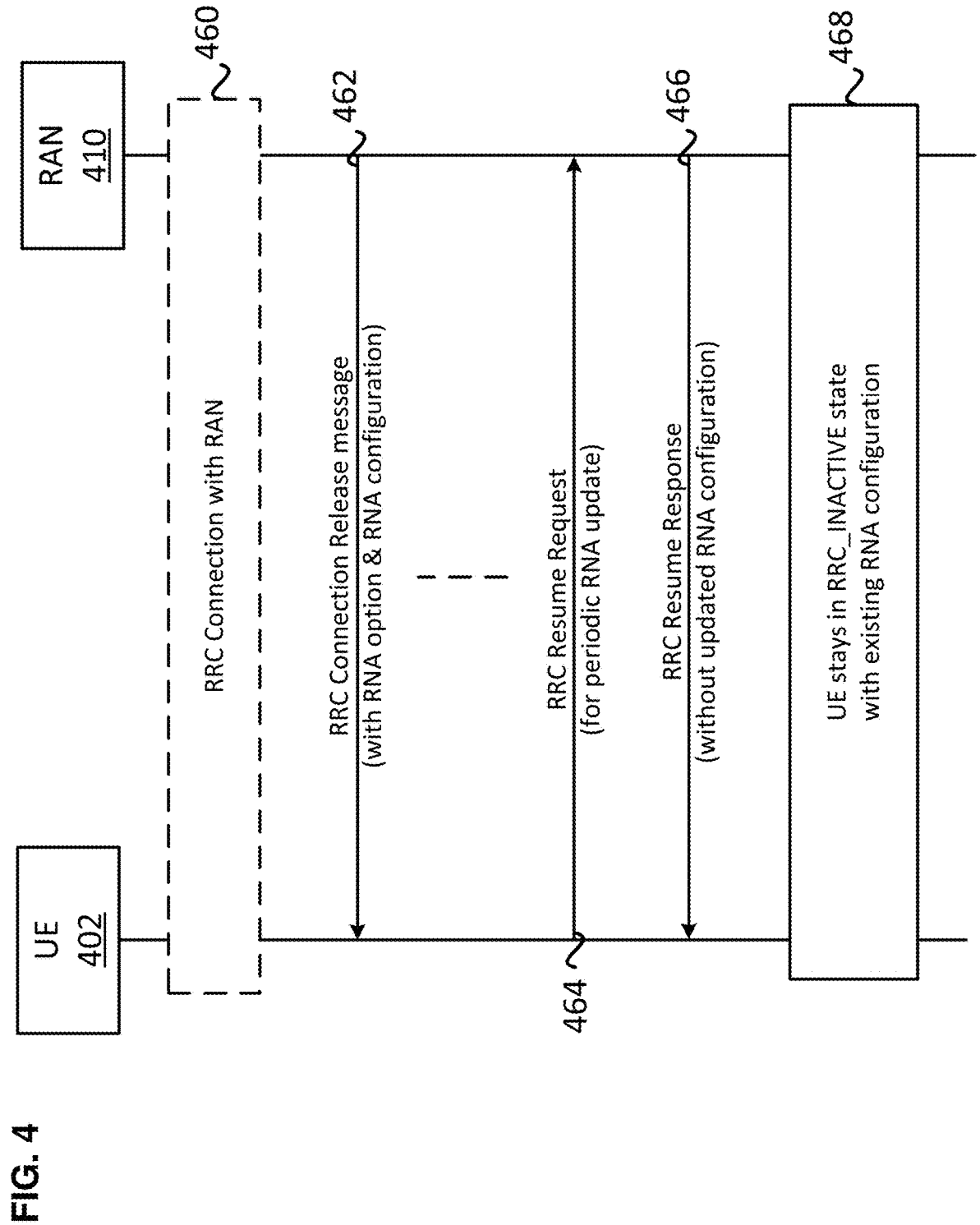
FIG. 4 is a diagram showing an example of UE transitioning to RRC Inactive state with existing RNA configuration and a procedure for re-using the RNA configuration regardless of RRC state transitions and change of serving gNBs, according to an exemplary implementation of the present application.

Case 1-1: RNA Configuration and RNA Option Stored in UE Context on Both UE and RAN Sides As shown in FIG. 4, in action 460, UE 402 is in RRC_CONNECTED state with RAN 410. In action 462, RAN 410 (e.g., having a serving gNB/cell of UE 402) provides an RRC Connection Release message (with an RRC Suspend configuration) to UE 402 to instruct UE 402 to transition to RRC_INACTIVE state. In addition, UE 402 is configured with an RNA option and an RNA configuration in the RRC Connection Release message in action 462 (e.g., in the RRC Suspend configuration). Thus, in the present implementation, UE 402 and RAN 410 may each store the RNA option and RNA configuration in the UE context. Also, in some implementations, the RNA option may be indicated by the format of RNA configuration (e.g., the RNA configuration may be either Cellidentity list, RAN Area ID list, or Tracking Area ID list in the RNA configuration) directly and so there is no specific RNA option field in the RRC signaling.

In action 464, UE 402 may send an RRC Resume Request to RAN 410, for example, to implement an RNA update (e.g. for the purpose of periodic RNA update). In action 466, the serving gNB/cell of RAN 410 may provide an RRC Resume Response message without providing a new or updated RNA option and RNA configuration to UE 402. In such a case, UE 402 may implicitly know that it can still apply the existing RNA option and RNA configuration after UE 402 receiving the RRC Resume Response message. It should be noted that UE 402 may be served by different serving gNBs/cells at different timings in RAN 410, while UE 402 moves around in the coverage of RAN 410. These serving gNBs/cells may obtain the existing RNA option and RNA configuration from the UE context (e.g., through backhaul connections). As shown in FIG. 4, {RNA option, RNA configuration} may be stored as part of the UE context in both UE 402 and RAN 410.

Figure 5:
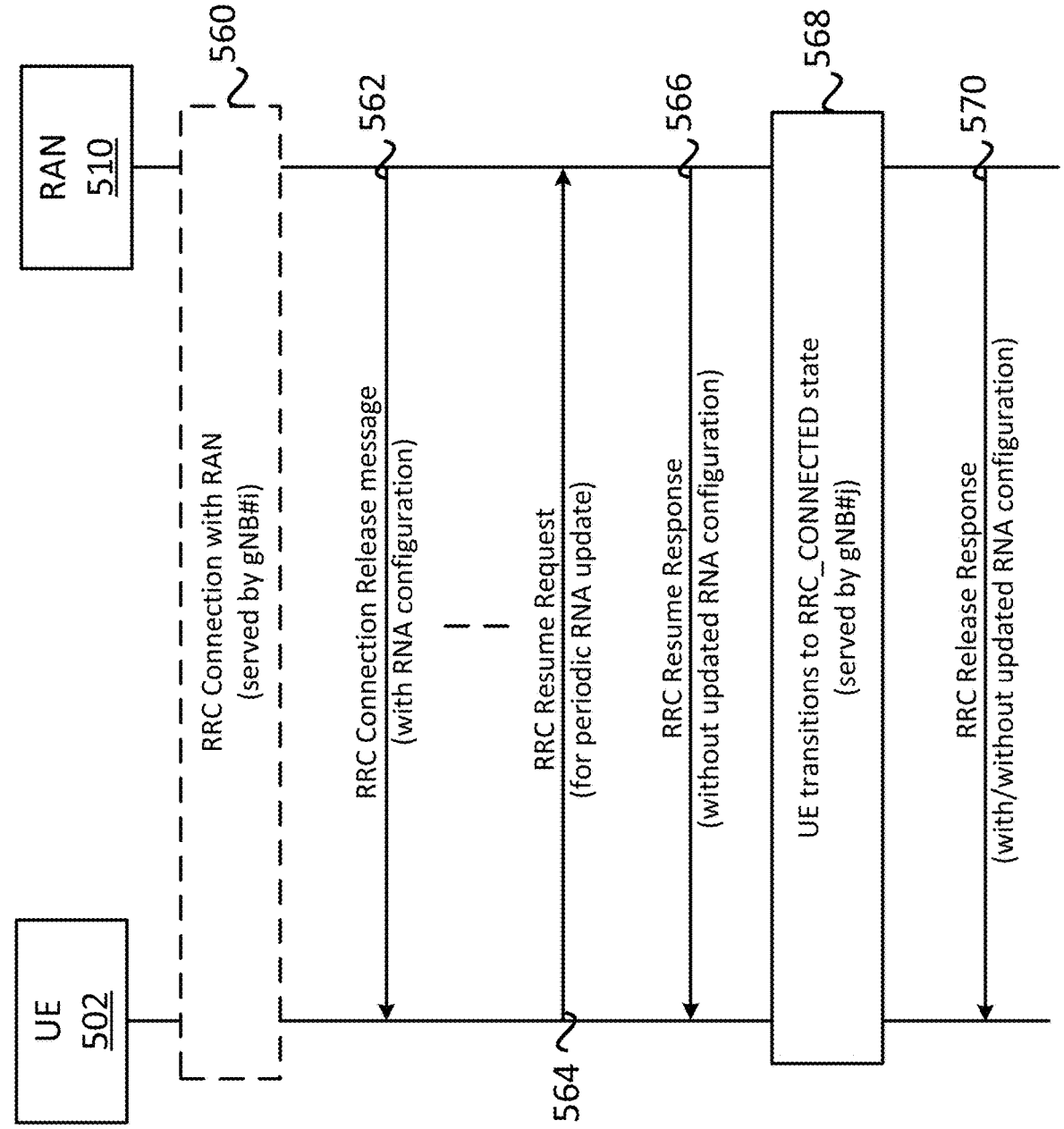
FIG. 5 is a diagram showing an example of UE connected and served by a gNB in RAN transitioning to RRC Connected state with another gNB in the RAN, and a procedure for re-using the RNA configuration regardless of RRC Connected/Inactive state transitions and change of serving gNBs, according to an exemplary implementation of the present application.

Case 1-2: RNA Configuration Reusable and Not Affected by RRC State Transitions and Change of Serving gNBs As shown in FIG. 5, in action 560, UE 502 is in RRC_CONNECTED state with RAN 510. In action 562, UE 502 receives an RNA configuration while receiving an RRC Connection Release message from a serving gNB$_{\#i}$ of RAN 510. In action 564, UE 502 may send an RRC Resume Request to RAN 510, for example, for periodic RNA update. In action 566, RAN 510 may send an RRC Resume Response without updated RNA configuration. In action 568, UE 502 connects with a different serving gNB$_{\#j}$ and then transitions to RRC_CONNECTED state. As shown in FIG. 5, in action 570, the serving gNB$_{\#j}$ of RAN 510 may provide an updated RNA configuration to UE 502 when the serving gNB$_{\#j}$ wants to instruct UE 502 to transition to RRC_INACTIVE state. The updated RNA configuration may be provided to UE 502 in an RRC Release Response message in action 570. It is noted that delta signaling may be applied to facilitate the RNA configuration update. The details of delta signaling will be provided below in implementations of Case 2. As shown in FIG. 5, the RNA configuration may be re-used (by both UE 502 and RAN 510), and the RNA configuration is not influenced or affected by RRC state transitions and change of serving gNBs if the UE receives the RRC Release Response message without an RNA configuration in action 570.

Figure 6:
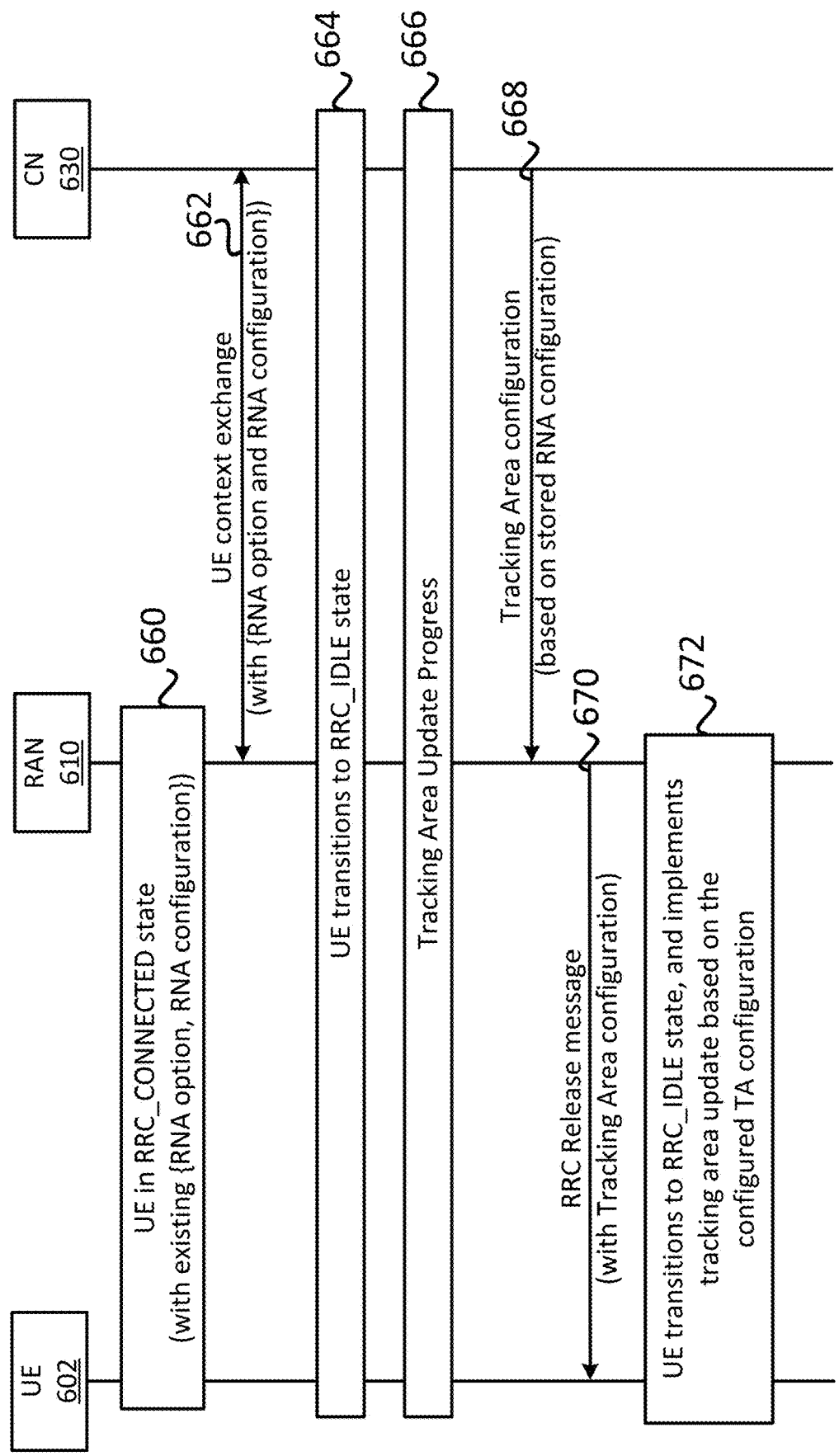
FIG. 6 is a diagram showing a relationship among UE, RAN and CN in which CN obtains UE context through backhaul connection in order to direct the UE to update Tracking Area Configuration (e.g., TAI (Tracking Area Identifier), or also known as Tracking Area ID) and a procedure for CN to provide updated Tracking Area Configuration based on the existing RNA option and RNA configuration, according to an exemplary implementation of the present application.

Case 1-3: CN Providing Tracking Area Configuration Based on Existing RNA Option and RNA Configuration As shown in FIG. 6, in action 660, UE 602 may be in RRC_CONNECTED state with RAN 610. In action 662, CN 630 may obtain an RNA option and RNA configuration through backhaul connection. In action 664, UE 602 transitions to RRC_IDLE state. In action 666, tracking area update may be performed. CN 630 may prepare a Tracking Area ID list to UE 602 based on the RNA configuration stored in UE context. In some implementations, CN 630 may indicate UE 602 to apply the existing RNA directly (e.g., actions 668 and 670). In some other implementations, delta signaling approach may also be applied based on the RNA configuration. Therefore, the NAS (Non-Access Stratum) signaling about tracking area configuration may be implemented as indicated in FIG. 7. In action 672, UE 602 may transition to RRC_IDLE state, and implements tracking area update based on the configured Tracking Area configuration.

In some implementations, UE 602 may apply the existing RNA configuration as the tracking area if ReuseExistingRNA=true, as shown in FIG. 7. Otherwise, UE 602 may generate the tracking area by jointly considering the existing RNA configuration and TAToAddlist and TAToRemovelist for the updated TA configuration. CN 630 may choose one of the format of Cellidentity, RAN Area ID and Tracking Area ID based on the obtained RNA option and RNA configuration. As shown in FIG. 6, CN 630 may provide Tracking Area Configuration based on the existing {RNA option, RNA configuration}.

In Cases 1-1, 1-2, and 1-3, the UE may store its own RNA configuration in the UE context automatically. In some other implementations, the RAN may instruct the UE to remove the existing RNA configuration through dedicated control signaling (e.g., through RRC signaling). This may happen when the gNB notices the existing RNA configuration is no longer usable for the UE.

Case 2: RNA Option Change and RNA Configuration Approaches

In Case 2, the following methods are provided for RNA option change. The first method is a semi-persistent RNA option change method. The second method is a dynamic RNA option change method. It is noted that the RNA configuration update is different from the RNA option change methods.

The semi-persistent RNA option change method is provided for non-frequent RNA option change. For example, the RNA option may be fixed in one or more PLMNs or in a large RAN area. In this condition, the RAN may configure a "RNA Option" IE through RRC signaling (e.g., through RRC Release message or RRC Re-configuration message), and the RNA option is configured in RRC signaling only when the RAN wants to change the RNA option of the UE. Then, the serving gNBs in the RAN may provide the RNA configuration without indicating the format of the RNA configuration. The UE may decode the RNA configuration directly based on the RNA option stored in the UE context.

The dynamic RNA option change method allows the RAN to change RNA options to the UE dynamically (e.g., by the RRC Resume Response message to UE during random access procedure). Therefore, there may be an RNA option field in the RRC Resume Response message.

Implementations of the above two RNA option change methods may be provided in the following sections. In addition, to decrease the additional overhead, delta signaling may also be applied in the signaling design.

Case 2-1: Semi-Persistent RNA Option Change

In Case 2-1, the RAN (e.g., the serving gNB of the UE) may provide the RNA option to UE through RRC signaling (e.g., through RRC Release message). For example, for the first time RNA configuration or RNA option change, the RNA option may be provided in the RRC Release message with a new RNA configuration (based on a new RNA option).

Figure 8:
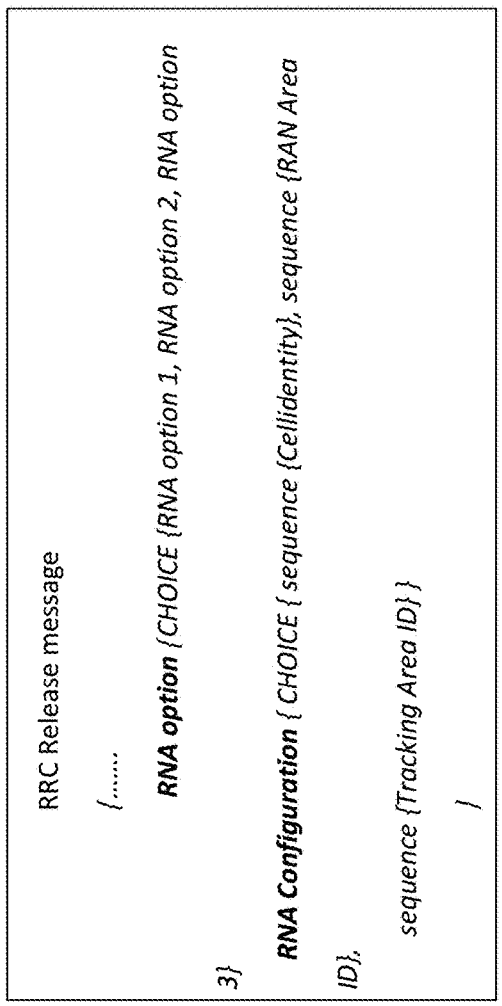
FIG. 8 is a diagram showing an example RRC release message having an RNA option and an RNA configuration, according to an exemplary implementation of the present application.

As shown in FIG. 8, RRC Release message 800 includes an RNA option and an RNA configuration. If RNA option=RNA option 1, the serving gNB may provide RAN Notification Area with sequence "Cellidentity" in RRC Resume Response message. If RNA option=RNA option 2, the serving gNB may provide RAN Notification Area with sequence "RAN Area ID" in RRC Resume Response message. If RNA option=RNA option 3, the serving gNB may provide RAN Notification Area with sequence "Tracking Area ID" in RRC Resume Response message. Otherwise, only RNA configuration may be provided in the RRC Release message (e.g., RRC Release message 900 in FIG. 9).

Figure 9:
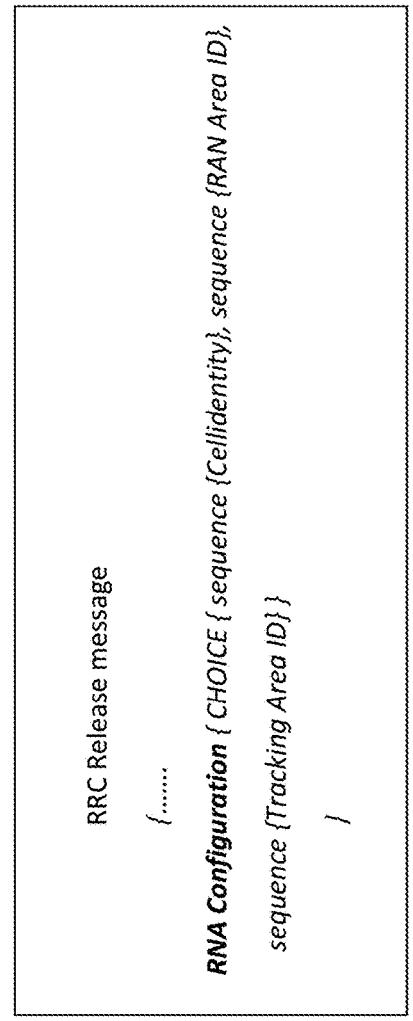
FIG. 9 is a diagram showing an example RRC Release message, according to an exemplary implementation of the present application.

The serving gNB provides the updated RNA configuration based on the existing RNA option stored in the UE context. Therefore, the UE may identify each object of the Cellidentity, RAN Area ID, or Tracking Area ID in the RNA configuration implicitly. In this implementation, the UE may replace the existing RNA configuration with the new RNA configuration when it receives the RNA option IE through the RRC signaling. Also, both of the RNA option and RNA configuration are part of the UE context. In some implementations, only the RNA configuration is provided in the RRC Release message (as shown in FIG. 9). In addition, the UE may overwrite the existing RNA configuration after the UE receives an updated RNA configuration from the serving gNB. The present implementation can also be used to with other RRC signaling (e.g., RRC Resume Response message, when an RRC_INACTIVE UE implements periodical/event-triggered RNA update with a RAN). Also, the present implementation is applicable without being influenced or affected by RRC state transitions or change of serving gNBs, similar to Case 1-2.

Case 2-2: Delta Signaling

In Case 2-2, only RNA configuration is updated in RRC signaling (without RNA option change). In this scenario, delta signaling may be applied to improve signaling efficiency. For example, two IES (e.g. RNAToAddModList and RNAToRemoveList) may be provided together through RRC signaling (e.g., RRC Release message or RRC Resume response message) for the serving gNB to indicate the updated RNA.

FIG. 10 shows the content of an example RRC Resume Response for applying delta signaling for RNA configuration update, according to an implementation of the present application.

In RRC Resume Response message 1000, an RNAToRemoveList includes part of the existing RNA configuration that needs to be removed. The RNAToAddModList includes additional RNA configuration that needs to be added in the updated RNA configuration. The formats of the RNAToAddModList and RNAToRemoveList follow those of the existing RNA option. Also, the RNAToAddModList and RNAToRemoveList may co-exist in one RRC message. In some implementations, an explicit release indication may be included in the RAN Notification Area IE (e.g., releaseall). Thus, the serving gNB may instruct the UE to release the entire existing RNA configuration when the RAN Notification Area IE is "releaseall". In one implementation, the RAN Notification Area IE (e.g., releaseall) may be configured with the RNAToAddModList in one RRC signaling. In some implementations, there may not be an explicit "releaseall" IE or RNAToRemoveList IE in the updated RNA configuration. Instead, only an RNAToAddModList may be provided in the updated RNA configuration, and the UE may overwrite the entire existing RNA configuration directly by storing the RNAToAddModList as the RNA configuration in the UE context.

Case 2-3: RNA Matching Procedure (Applicable to Case 2 and Case 2-1)

In Case 2-3, only one RNA option may be configured to a UE. Based on the stored RNA option and RNA configuration, the UE needs to perform an RNA matching procedure every time when the UE camps to a Serving Cell. Each Cell in the RAN may broadcast Cellidentity, RANAC (optional), and Tracking Area ID through system information delivery. Therefore, the UE may obtain these information by receiving broadcast message from the Serving Cell. When the UE receives R_Cellidentity and R_RANAC, R_TAI from the serving Cell, then, based on the stored RNA configuration (and RNA option), the UE may implement the RNA matching procedure 1100 in FIG. 11. Also, in some implementations, the serving Cell may broadcast more than one R_Cellidentity (each with associated PLMN identity, R_PLMN), more than one R_RANAC, or more than one R_TAI in system information.

In Event #2-1, the UE may consider the Serving Cell to be located on the UE's RNA if the UE finds a matched Cellidentity among the R Cellidentity delivered by the Serving Cell. Otherwise, the Serving Cell is considered to be out of the UE's RNA. In some implementations, the Serving Cell may broadcast the Cellidentity with one associated PLMN identity (R_PLMN). In the UE's RNA configuration, each Cellidentity may also be associated with one PLMN identity. In such a case, the UE may need to compare the R_Cellidentity and R_PLMN (also being broadcasted with the associated R_Cellidentity) with the UE's RNA configuration. In addition, the UE needs to implement Event #2-1 to all the R_Cellidentities broadcasted by the Serving Cell.

In Event #2-2, the UE may consider the Serving Cell to be located on the UE's RNA if the UE finds a matched RAN Area ID among the R_RANAC and R_TAI delivered by the Serving Cell. Otherwise, the Serving Cell would be considered to be out of the UE's RNA if neither the Cellidentity (with associated PLMN identity) nor TAC (with associated PLMN identity) matches with the UE's RNA configuration. It is noted that the Serving Cell may not broadcast RANAC, and therefore the R_RANAC may be absent. In some implementations, one R_RANAC is associated with one R_TAI (one PLMN identity and one tracking area code) in the broadcasting message from the Serving Cell. In contrast, in the UE's RNA configuration, each RANAC may also be associated with one PLMN identity and tracking area code. Therefore, during the RNA matching procedure, the UE considers both the RAN Area ID and the associated TAI. In addition, the UE may need to implement Event #2-2 to all the R_RANAC and R_TAI broadcasted by the Serving Cell.

In Event #2-3, the UE may consider the Serving Cell to be located on the UE's RNA if the UE finds a matched Tracking Area ID. Otherwise, the Serving Cell is considered to be out of the UE's RNA. In some other implementations, one Tracking Area ID is associated with one PLMN identity in the broadcasting message from the Serving Cell. Moreover, in the UE's RNA configuration, one Tracking Area ID may cover one TAC with one associated PLMN identity. Therefore, during the RNA matching procedure, the UE considers both TAC and the associated PLMN identity to find out the matched Tracking Area ID. In addition, the UE may need to implement Event #2-3 to all the R_TAI broadcasted by the Serving Cell.

It should be noted that the UE may change its behavior in RNA matching procedure while the RNA option is changed.

Case 3: Dynamic RNA Option Change

Figure 12:
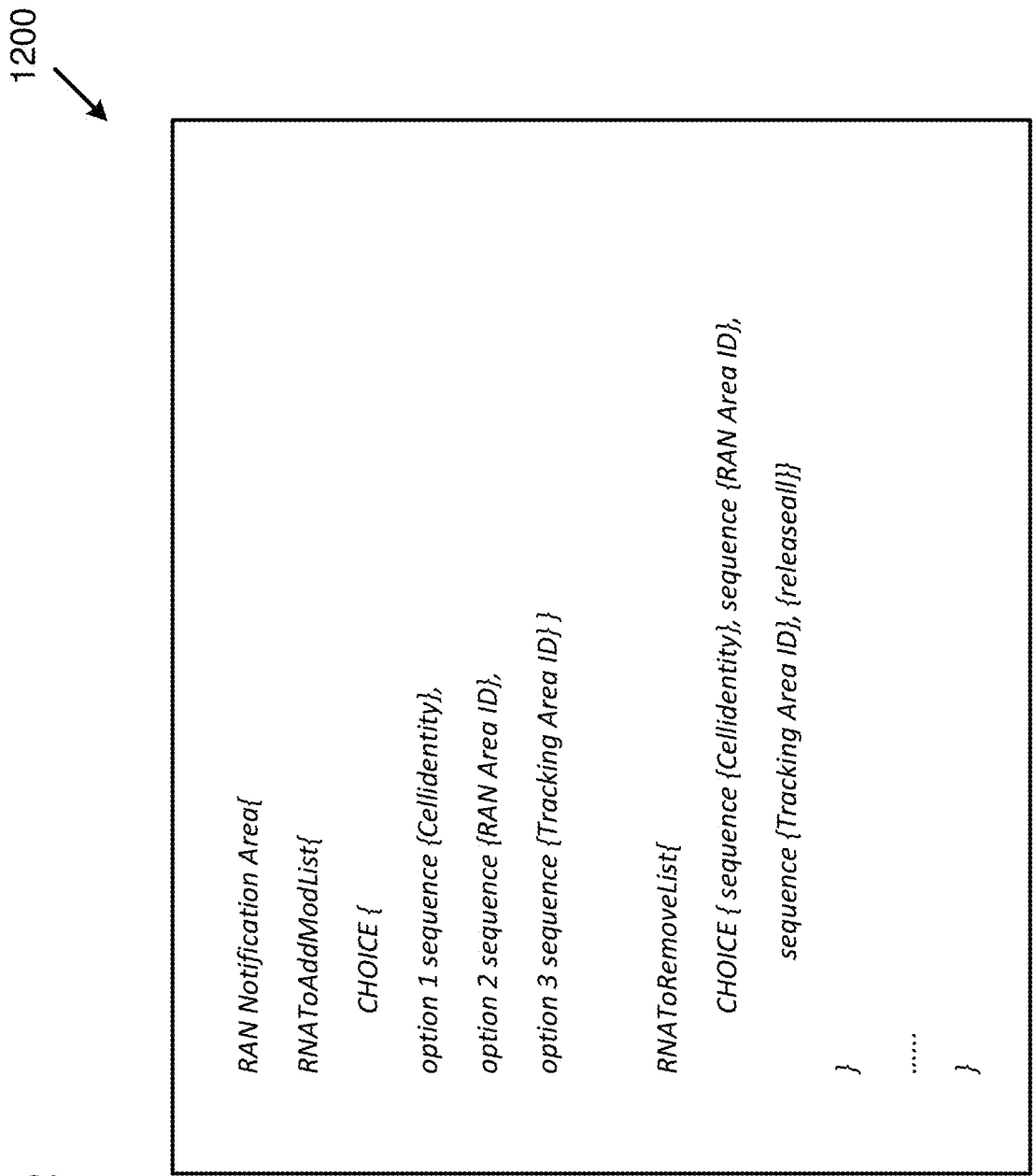
FIG. 12 is a diagram showing an example RNA configuration, according to an exemplary implementation of the present application.

In Case 3, there may be no individual "RNA option" IE in the RRC signaling. Instead, the RNA configuration may cover the information of RNA option as shown in RNA configuration 1200 in FIG. 12.

After receiving the RNAToAddModList, the UE may perform the following. When the UE does not have existing RNA configuration, the UE may take the RNAToAddModList as the existing RNA configuration and take the RNA option in the RNAToAddModList as the existing RNA option. When the RNA option in the RNAToAddModList is the RNA option of existing RNA configuration, the UE may add the new RNA configuration into the existing RNA configuration. When the RNA option in the RNAToAddModList is not the RNA option of existing RNA configuration, the UE may withdraw the existing RNA configuration and then take this new RNAToAddModList as the existing RNA configuration and take the RNA option in the RNAToAddModList as the existing RNA option.

The RNAToRemoveList includes parts of the existing RNA configuration that needs to be removed. The format of RNAToRemoveList follows the RNA option of existing RNA configuration. Also, the RNAToAddModList and RNAToRemoveList may co-exist in one RRC message. In the present implementation, the gNB needs to indicate the RNA option in the RNAToAddModList. As such, the UE may know how to decode the following RNA configuration.

In some other implementations, an explicit release indication may be included in the RAN Notification Area IE (e.g., releaseall). As such, the gNB may instruct the UE to release the entire existing RNA configuration when the RAN Notification Area IE is "releaseall". The releaseall IE may be set with the RNAToAddModList, so that the gNB may indicate UE to release the entire existing RNA configuration without changing the RNA option. In some implementations, there may not be an explicit "releaseall" IE nor RNAToRemoveList IE in the updated RNA configuration. Instead, only an RNAToAddModList is provided in the updated RNA configuration, and the UE may overwrite the entire existing RNA configuration directly by storing the RNAToAddModList as the RNA configuration in the UE context.

Case 3-1: Multiple RNA Options Co-Existing

Figure 13:
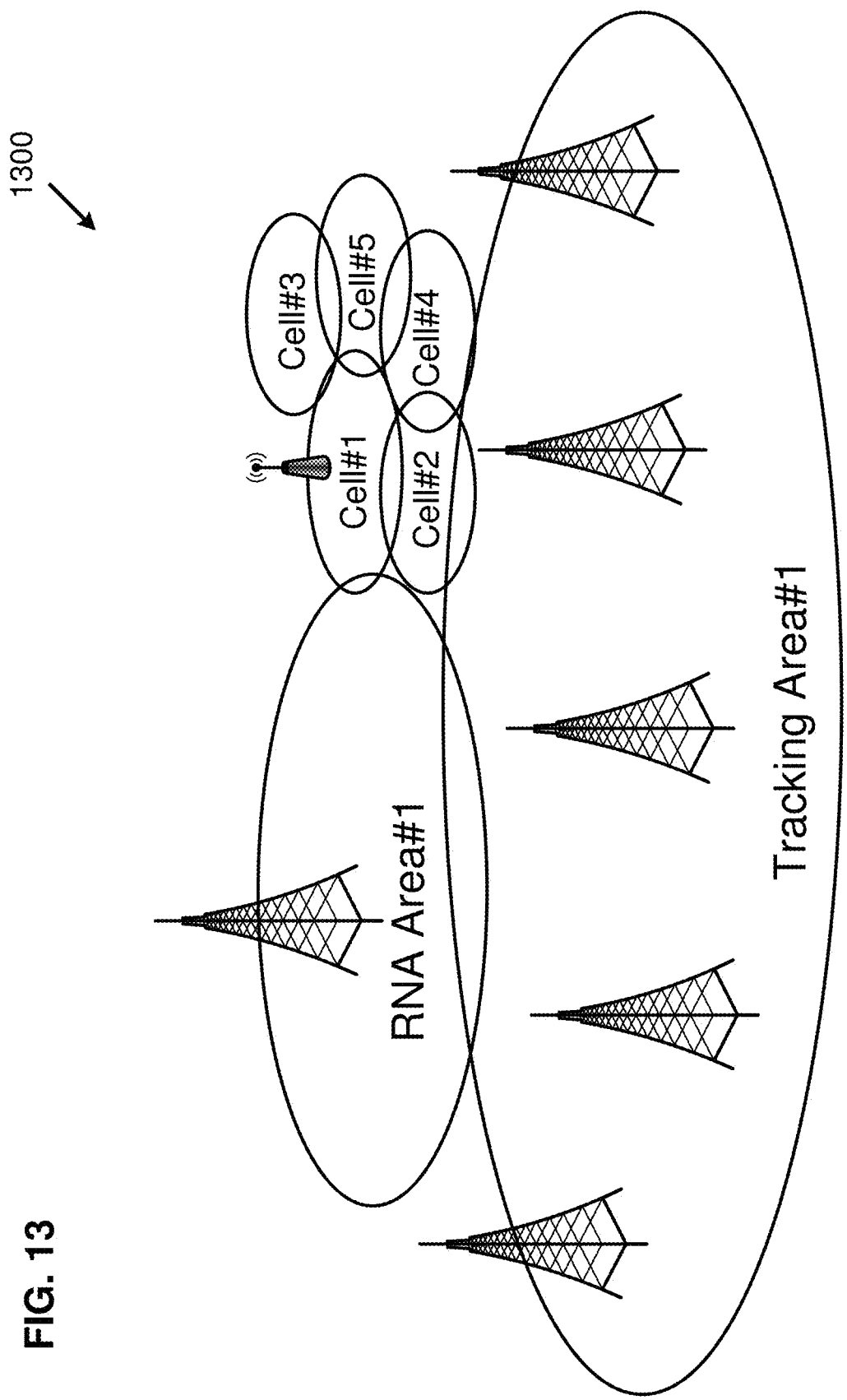
FIG. 13 is a diagram showing an example of an RNA configuration having any combination of a Cellidentity list, a RAN Area ID list, and/or a Tracking Area ID list, according to an exemplary implementation of the present application.

In the previous implementation, only one RNA option may be provided in the RNA configuration. In Case 3-1, the RNA configuration can be composed by a Cellidentity list, a RAN Area ID list, a Tracking Area ID list, or any combination thereof. As in FIG. 13, an RNA configuration of a UE is shown. As shown in FIG. 13, only one RNA is configured and this RNA configuration includes 5 Cells (Cells #1, #2, #3, #4, and #5), one RNA Area (RNA Area #1), and one Tracking Area (Tracking Area #1). The RAN may configure any combination of a Cellidentity list, a RAN Area ID list, and/or a Tracking Area ID list, for example, based on the UE's historical record of mobility. Also, in some implementations, the RNA configuration shown in FIG. 13 may be composed by Cells, RNA Areas, and Tracking Areas of different associated PLMNs.

In the RAN, Cells may broadcast the Cells' Cellidentities (each Cellidentity may be associated with one PLMN identity), RANAC(s) (optional), and Tracking Area ID(s) (each Tracking Area ID may be associated with one PLMN identity) through broadcasting system information (e.g. System Information Block type #1, SIB #1) and therefore the UE can receive the Cellidentity(-ies), RANAC(s) (optional), and Tracking Area ID(s) from the UE's serving Cell. Then, the UE may do at least one of Events #3-1, #3-2, and #3-3.

For RNA Matching, in Event #3-1, the UE compares the received Cellidentity with the Cellidentity list in the stored RNA configuration. If the Cell broadcasts RANAC in SIB #1, then the UE may perform Event #3-2. In Event #3-2, the UE may compare the received RANAC and TAI with the RAN Area ID list in the stored RNA configuration. In Event #3-3, the UE may compare the received Tracking Area ID with the Tracking Area ID list in the stored RNA configuration. In some implementations, the cellidentity/RAN Area ID/TAI may be associated with one PLMN identity. In these implementations, the UE may implement RNA Matching procedure along with the associated PLMN identity.

The UE may consider the serving Cell belongs to the UE's RNA if the UE discovers or determines that:
  (1) Outcome #1: Matched Cellidentity after implementing Event #3-1; or
  (2) Outcome #2: Matched RAN Area ID after implementing Event #3-2; or
  (3) Outcome #3: Matched Tracking Area ID after implementing Event #3-3.
Otherwise, the UE may consider the serving Cell to be out of the UE's RNA.

In some implementations, the UE may consider the serving Cell belongs to the UE's RNA if the UE discovers or determines that:
  (1) Outcome #1: Matched Cellidentity (along with associated PLMN identity after implementing Event #3-1;
  (2) Outcome #2: Matched RAN Area ID (along with associated PLMN identity after implementing Event #3-2; or (3) Outcome #3: Matched Tracking Area ID (along with associated PLMN identity) after implementing Event #3-3.

Otherwise, the UE may consider the serving Cell to be out of the UE's RNA.

In some implementations, the UE may perform an RNA Matching Procedure as in the following sequence. First, the UE compares the received Tracking Area ID with the Tracking Area ID list in the stored RNA configuration. If the UE determines the received Tracking Area ID matches with the Tracking Area ID list, then the UE considers the Serving Cell belongs to the UE's RNA. If the received Tracking Area ID does not match with the stored Tracking Area ID list, then the UE checks if the Serving Cell broadcasts RANAC in SIB #1. If the received RANAC and Tracking Area ID match with the RAN Area ID list in the stored RNA configuration, then the UE considers the Serving Cell belongs to the UE's RNA. If the Serving Cell does not broadcast RANAC in SIB #1, then the UE compares the received Cellidentity with the Cellidentity list in the stored RNA configuration. If the received Cellidentity matches with the Cellidentity list in the stored RNA configuration, then the UE considers the Serving Cell belongs to the UE's RNA. Otherwise, the UE considers the Serving Cell to be out of the UE's RNA.

In some implementations, the UE may decide which event to implement firstly. FIG. 13 shows one RNA configuration may be a combination of a Cellidentity list, a RAN Area ID list, and/or a Tracking Area ID list. To realize multiple RNA options co-existing in one RNA configuration, the RNAToAddModList and RNAToRemoveList are shown in FIG. 14.

As shown in FIG. 14, it is clear that both the RNAToAddModList and RNAToRemoveList may include different combinations of a Cellidentity list, a RAN Area ID list, and/or a Tracking Area ID list. In addition, the RNAToAddModList and RNAToRemoveList may co-exist in one RRC message. In other implementations, an explicit release indication may be included in the RAN Notification Area IE (e.g. releaseall). The gNB may instruct the UE to release all existing RNA configuration when the RAN Notification Area IE is "releaseall". The releaseall IE may be set with the RNAToAddModList and therefore the gNB may indicate the UE to release the existing RNA configuration and add new RNA configuration simultaneously. In some implementations, there may not be an explicit "releaseall" IE nor RNAToRemoveList IE in the updated RNA configuration. Instead, only an RNAToAddModList is provided in the updated RNA configuration, and the UE may overwrite the entire existing RNA configuration directly by storing the RNAToAddModList as the RNA configuration in the UE context.

Figure 15:
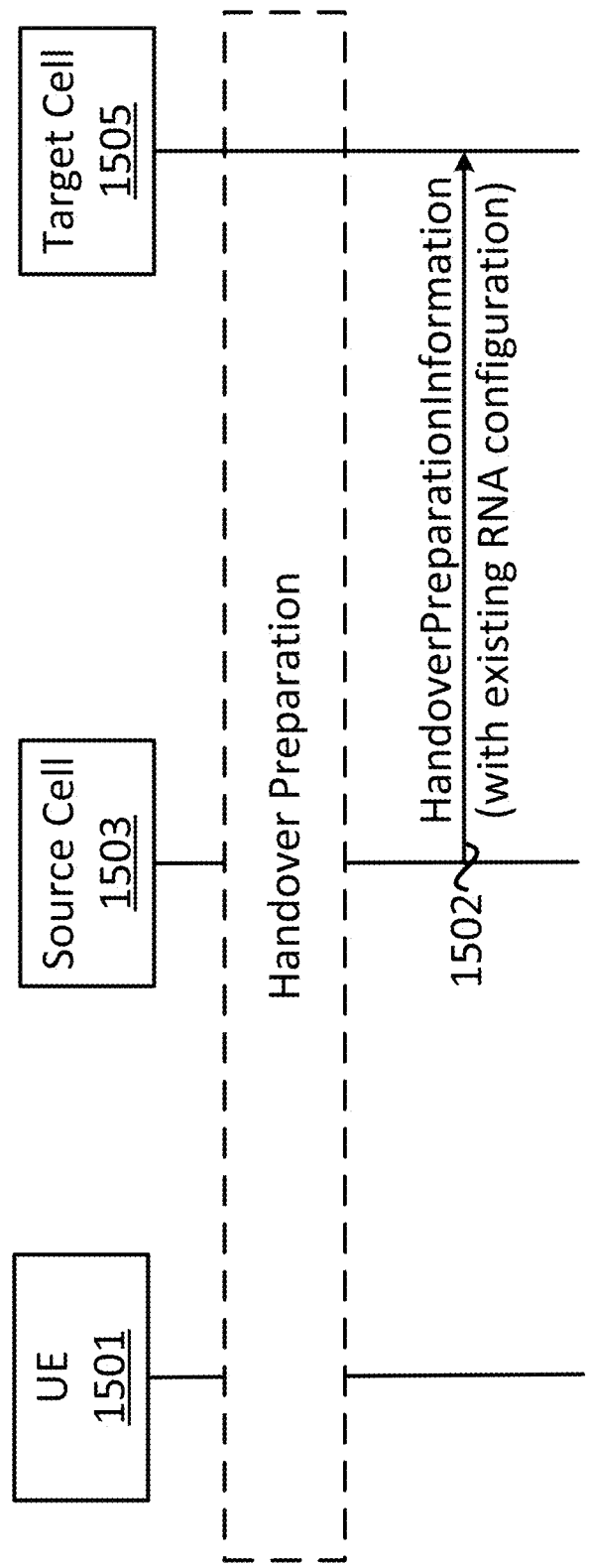
FIG. 15 illustrates a diagram showing that an existing RNA configuration to a UE in RRC Connected state is delivered from a source cell to a target cell through backhaul connection during a handover preparation procedure of the UE, according to an exemplary implementation of the present application.

FIG. 15 illustrates a diagram showing that an existing RNA configuration to a UE in RRC Connected state is delivered from a source cell to a target cell through backhaul connection during a handover preparation procedure of the UE, according to an exemplary implementation of the present application. In FIG. 15, UE 1501 is in RRC Connected state. In FIG. 15, source cell 1503 (or the CN connected with source cell 1503) decides to trigger handover procedure during a Handover Preparation procedure (e.g., the handover procedure may be triggered based on the UE's measurement reports in air links) for UE 1501. Then, in action 1502, source cell 1503 may transmit a Handover Request along with the UE context (which may include AS context and NAS context) of UE 1501 to target cell 1505 within dedicated control signaling (e.g., Handover Preparation Information). The Handover Preparation Information signal may be delivered through wired/wireless backhaul connection or through the relay of CN(s) connected with the source cell 1503 and target cell 1505. Moreover, the existing RNA configuration of UE 1501 may also be included in the Handover Preparation Information to target cell 1505. Thus, the RNA configuration to a UE will not be influenced or affected by handover procedure. In some implementations, there may be multiple target cells in the handover preparation procedure. Thus, the source cell needs to transmit the Handover Preparation Information to each target cell by following the procedure shown in FIG. 15.

In some additional embodiments, the handover procedure in FIG. 15 is applicable to the following handover scenarios:
  a) Intra-RAT handover procedure (both of source cell 1503 and target cell 1505 are NR cells or E-UTRAN cells).
  b) Inter-RAT handover procedure (e.g., source cell 1503 is a NR cell and target cell 1505 is an E-UTRAN cell or vice versa).
  c) Inter-system handover procedure (e.g., source cell 1503 is an E-UTRAN cell connected with EPC and target cell 1505 is an E-UTRAN cell connected with 5GC or vice versa).

Figure 16A:
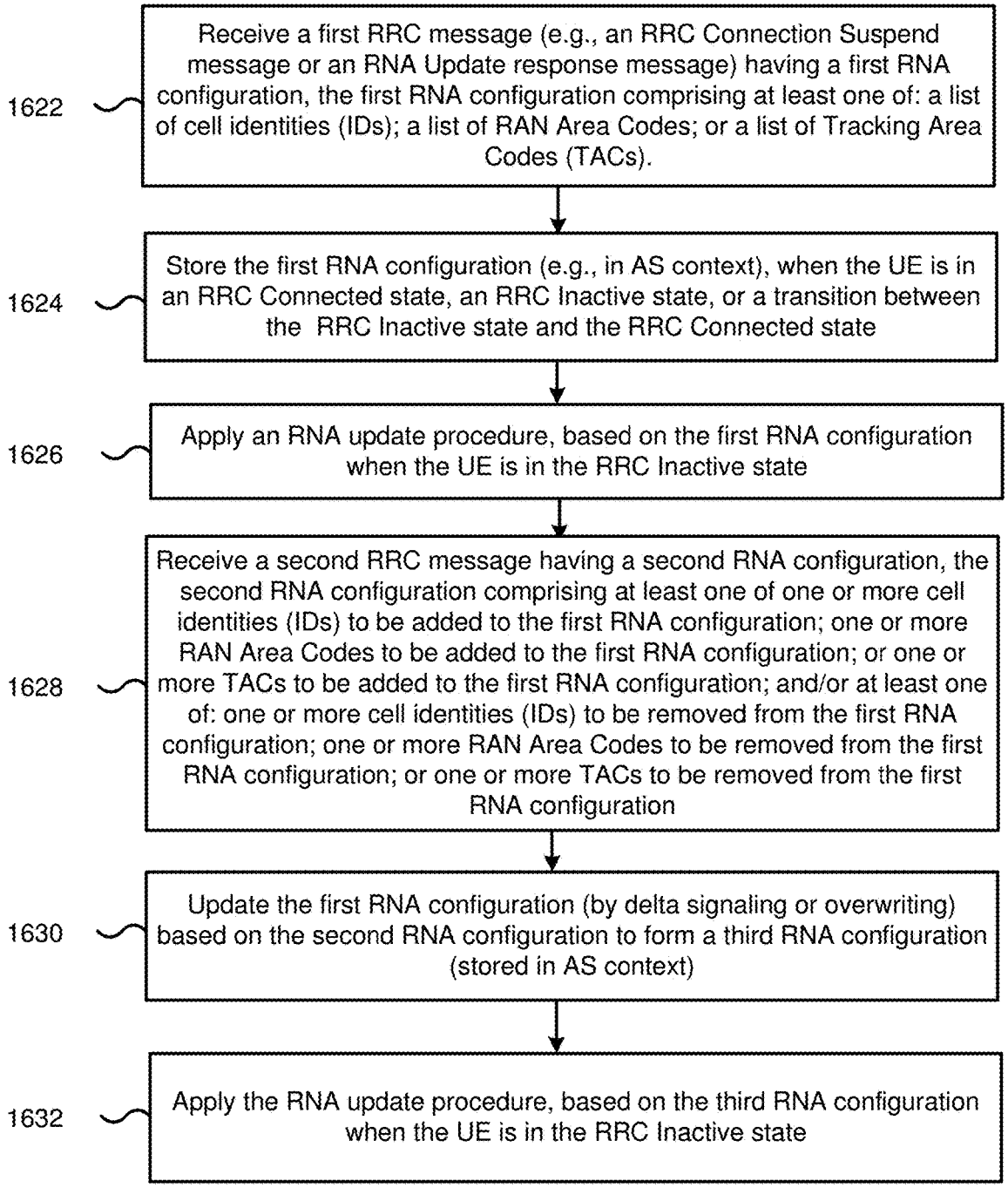
FIG. 16A is a flowchart of a method of RNA management for a UE, according to an example implementation of the present application.

FIG. 16A is a flowchart of a method of RNA management for a UE, according to an example implementation of the present application. In FIG. 16A, flowchart 1620 includes actions 1622, 1624, 1626, 1628, 1630, and 1632.

In action 1622, the UE may receive a first RRC message (e.g., an RRC Connection Suspend message or an RNA Update response message) having a first RNA configuration, the first RNA configuration comprising at least one of: a list of cell identities (IDs); a list of RAN Area Codes; or a list of Tracking Area Codes (TACs).

In action 1624, the UE may store the first RNA configuration (e.g., in AS context), when the UE is in an RRC Connected state, an RRC Inactive state, or transitioning between the RRC Inactive state and the RRC Connected state.

In action 1626, the UE may apply an RNA update procedure, based on the first RNA configuration when the UE is in the RRC Inactive state.

In action 1628, the UE may receive a second RRC message having a second RNA configuration (e.g., in AS context)), the second RNA configuration comprising at least one of one or more cell identities (IDs) to be added to the first RNA configuration; one or more RAN Area Codes to be added to the first RNA configuration; or one or more TACs to be added to the first RNA configuration; and/or at least one of: one or more cell identities (IDs) to be removed from the first RNA configuration; one or more RAN Area Codes to be removed from the first RNA configuration; or one or more TACs to be removed from the first RNA configuration.

In action 1630, the UE may update the first RNA configuration (by delta signaling or overwriting) based on the second RNA configuration to form a third RNA configuration (stored in AS context).

In action 1632, the UE may apply the RNA update procedure, based on the third RNA configuration when the UE is in the RRC Inactive state.

Figure 16B:
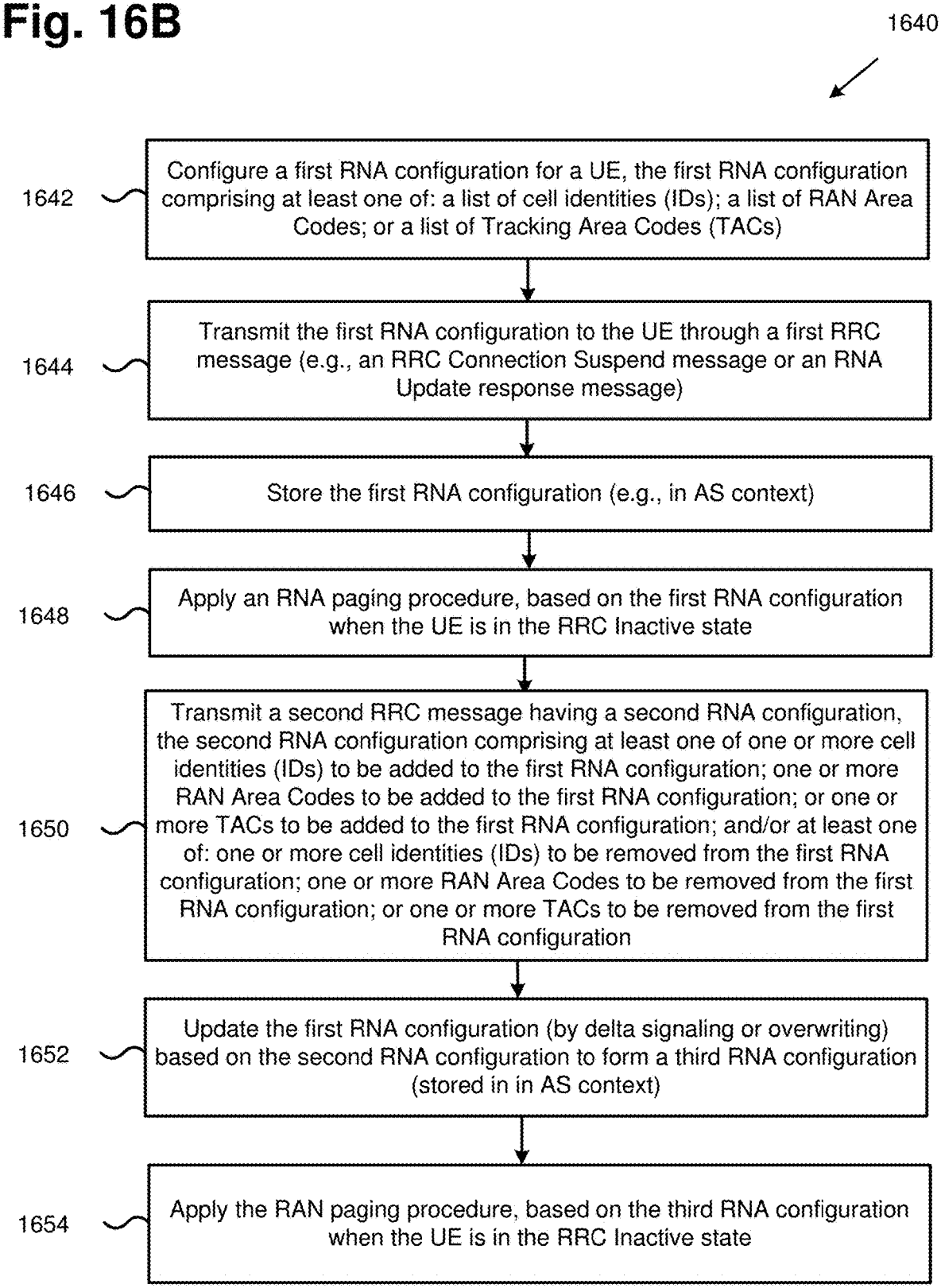
FIG. 16B is a flowchart of a method of RNA management for a base station, according to an example implementation of the present application.

FIG. 16B is a flowchart of a method of RNA management for a base station, according to an example implementation of the present application. In FIG. 16B, flowchart 1640 includes actions 1642, 1644, 1646, 1648, 1650, 1652, and 1654.

In action 1642, the base station may configure a first RNA configuration for a UE, the first RNA configuration comprising at least one of: a list of cell identities (IDs); a list of RAN Area Codes; or a list of Tracking Area Codes (TACs).

In action 1644, the base station may transmit the first RNA configuration to the UE through a first RRC message (e.g., an RRC Connection Suspend message or an RNA Update response message).

In action 1646, the base station may store the first RNA configuration (e.g., in AS context).

In action 1648, the base station may apply a RAN paging procedure, based on the first RNA configuration when the UE is in an RRC Inactive state.

In action 1650, the base station may transmit a second RRC message having a second RNA configuration. The second RNA configuration includes at least one of one or more cell identities (IDs) to be added to the first RNA configuration; one or more RAN Area Codes to be added to the first RNA configuration; or one or more TACs to be added to the first RNA configuration; and/or at least one of: one or more cell identities (IDs) to be removed from the first RNA configuration; one or more RAN Area Codes to be removed from the first RNA configuration; or one or more TACs to be removed from the first RNA configuration.

In action 1652, the base station may update the first RNA configuration (by delta signaling or overwriting) of the UE based on the second RNA configuration to form a third RNA configuration (stored in AS context).

In action 1654, the base station may apply the RAN paging procedure, based on the third RNA configuration when the UE is in an RRC Inactive state.

Figure 17:
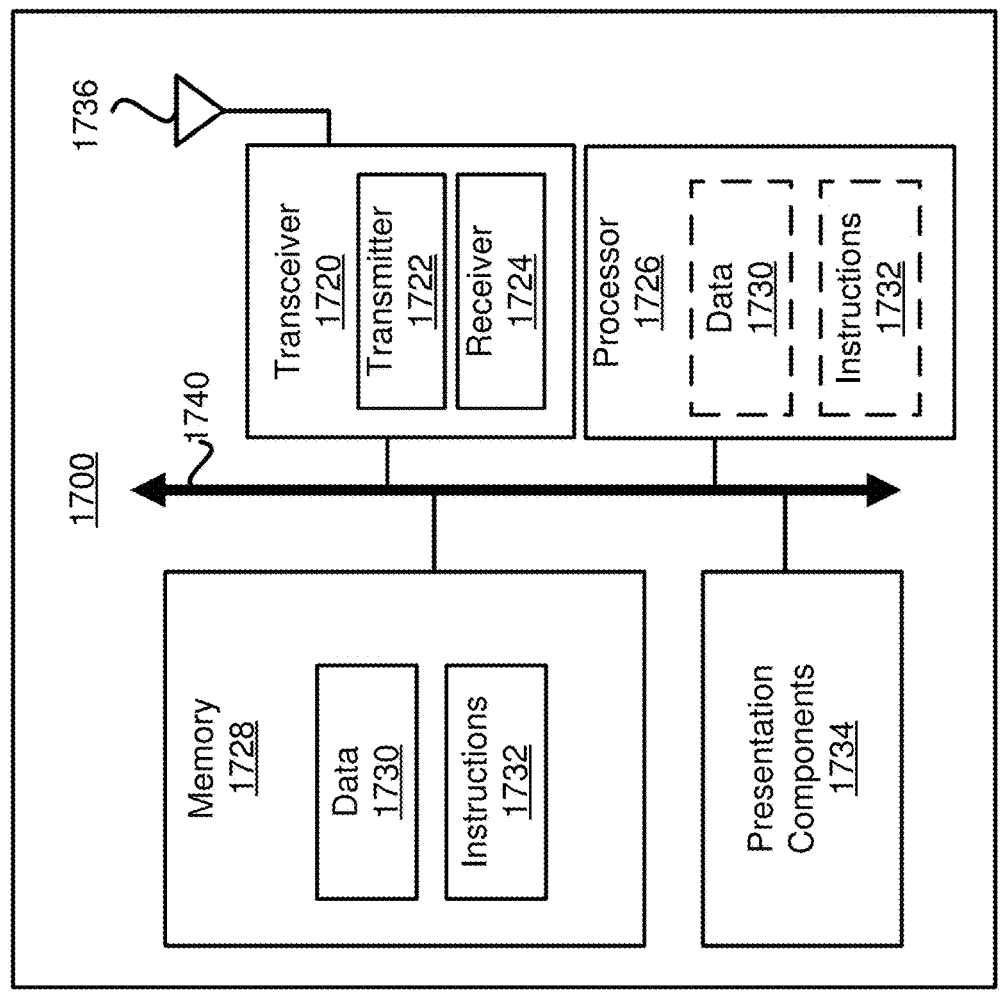
FIG. 17 illustrates a block diagram of a node for wireless communication, in accordance with various aspects of the present application.

FIG. 17 illustrates a block diagram of a node for wireless communication, in accordance with various aspects of the present application. As shown in FIG. 17, node 1700 may include transceiver 1720, processor 1726, memory 1728, one or more presentation components 1734, and at least one antenna 1736. Node 1700 may also include a Radio Frequency (RF) spectrum band module, a base station communications module, a network communications module, and a system communications management module, input/output (I/O) ports, I/O components, and power supply (not explicitly shown in FIG. 17). Each of these components may be in communication with each other, directly or indirectly, over one or more buses 1740.

Transceiver 1720 having transmitter 1722 and receiver 1724 may be configured to transmit and/or receive time and/or frequency resource partitioning information. In some implementations, transceiver 1720 may be configured to transmit in different types of subframes and slots including, but not limited to, usable, non-usable and flexibly usable subframes and slot formats. Transceiver 1720 may be configured to receive data and control channels.

Node 1700 may include a variety of computer-readable media. Computer-readable media can be any available media that can be accessed by node 1700 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1728 may include computer-storage media in the form of volatile and/or non-volatile memory. Memory 1728 may be removable, non-removable, or a combination thereof. Exemplary memory includes solid-state memory, hard drives, optical-disc drives, and etc. As illustrated in FIG. 17, memory 1728 may store computer-readable, computer-executable instructions 1732 (e.g., software codes) that are configured to, when executed, cause processor 1726 to perform various functions described herein, for example, with reference to FIGS. 1 through 16B. Alternatively, instructions 1732 may not be directly executable by processor 1726 but be configured to cause node 1700 (e.g., when compiled and executed) to perform various functions described herein.

Processor 1726 may include an intelligent hardware device, e.g., a central processing unit (CPU), a microcontroller, an ASIC, and etc. Processor 1726 may include memory. Processor 1726 may process data 1730 and instructions 1732 received from memory 1728, and information through transceiver 1720, the base band communications module, and/or the network communications module. Processor 1726 may also process information to be sent to transceiver 1720 for transmission through antenna 1736, to the network communications module for transmission to a core network.

One or more presentation components 1734 presents data indications to a person or other device. Exemplary one or more presentation components 1734 include a display device, speaker, printing component, vibrating component, and etc.

From the above description, it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for Radio Access Network (RAN) Notification Area (RNA) management performed by a user equipment (UE), the method comprising:
   receiving a first Radio Resource Control (RRC) message having a first RNA configuration;
   storing the first RNA configuration when the UE is in an RRC Connected state, an RRC Inactive state, or transitioning between the RRC Inactive state and the RRC Connected state;

23 receiving a second RRC message that doesn't include any RNA configuration; and
when the UE is in the RRC Inactive state, applying an RNA update procedure based on the first RNA configuration in response to the reception of the second RRC message.

2. The method of claim 1, wherein the first RNA configuration comprises at least one of:
a list of cell identities (IDs);
a list of RAN Area Codes (RANACs); or
a list of Tracking Area Codes (TACs).

3. The method of claim 1, wherein the first RRC message is an RRC Connection Suspend message or an RNA Update response message.

4. The method of claim 1, wherein the RNA update procedure is triggered either periodically, or when the UE moves out of an RNA defined by the first RNA configuration.

5. The method of claim 1, further comprising:
receiving a third RRC message having a second RNA configuration;
updating the first RNA configuration based on the second RNA configuration to form a third RNA configuration; and
applying the RNA update procedure based on the third RNA configuration when the UE is in the RRC Inactive state.

6. The method of claim 5, wherein the second RNA configuration comprises at least one of:
one or more cell identities (IDs) to be added to the first RNA configuration;
one or more RAN Area Codes (RANACs) to be added to the first RNA configuration; or
one or more Tracking Area Codes (TACs) to be added to the first RNA configuration.

7. The method of claim 5, wherein the second RNA configuration comprises at least one of:
one or more cell identities (IDs) to be removed from the first RNA configuration;
one or more RAN Area Codes (RANACs) to be removed from the first RNA configuration; or
one or more Tracking Area Codes (TACs) to be removed from the first RNA configuration.

8. The method of claim 1, further comprising:
receiving a third RRC message having a second RNA configuration;
overwriting the first RNA configuration by the second RNA configuration; and
applying the RNA update procedure based on the second RNA configuration when the UE is in the RRC Inactive state.

9. The method of claim 1, wherein the second RRC message is one of an RRC resume response message or an RRC release response message.

10. The method of claim 5, wherein at least one of the first, second, or third RNA configurations is stored by the UE in Access Stratum (AS) context.

11. A method for Radio Access Network (RAN) Notification Area (RNA) management performed by a base station, the method comprising:
generating a first RNA configuration for a user equipment (UE);

24 transmitting the first RNA configuration to the UE through a first Radio Resource Control (RRC) message;
storing the first RNA configuration;
transmitting, to the UE, a second RRC message that doesn't include any RNA configuration; and
when the UE is in an RRC Inactive state, applying a RAN paging procedure based on the first RNA configuration in response to the transmission of the second RRC message to the UE.

12. The method of claim 11, wherein the first RNA configuration comprises at least one of:
a list of cell identities (IDs);
a list of RAN Area Codes (RANACs); or
a list of Tracking Area Codes (TACs).

13. The method of claim 11, wherein the first RRC message is an RRC Connection Suspend message or an RNA Update Response message.

14. The method of claim 11, further comprising:
transmitting, to the UE, a third RRC message that includes a second RNA configuration;
updating the first RNA configuration based on the second RNA configuration to form a third RNA configuration; and
applying the RAN paging procedure based on the third RNA configuration when the UE is in the RRC Inactive state.

15. The method of claim 14, wherein the second RNA configuration comprises at least one of:
one or more cell identities (IDs) to be added to the first RNA configuration;
one or more RAN Area Codes (RANACs) to be added to the first RNA configuration; or
one or more Tracking Area Codes (TACs) to be added to the first RNA configuration.

16. The method of claim 14, wherein the second RNA configuration comprises at least one of:
one or more cell identities (IDs) to be removed from the first RNA configuration;
one or more RAN Area Codes (RANACs) to be removed from the first RNA configuration; or
one or more Tracking Area Codes (TACs) to be removed from the first RNA configuration.

17. The method of claim 11, further comprising:
transmitting a third RRC message having a second RNA configuration to the UE;
overwriting the first RNA configuration by the second RNA configuration; and
applying the RAN paging procedure based on the second RNA configuration when the UE is in the RRC Inactive state.

18. The method of claim 11, wherein the second RRC message is one of an RRC resume response message or an RRC release response message.

19. The method of claim 14, wherein at least one of the first, second, or third RNA configurations is stored by the base station in Access Stratum (AS) context of the UE.

20. The method of claim 11, further comprising:
transmitting the first RNA configuration as part of Access Stratum (AS) context of the UE to one or more target base stations in one or more Handover Preparation Information signals during a handover procedure of the UE.

* * * * *